(12) United States Patent
Shimanuki et al.

(10) Patent No.: US 11,260,470 B2
(45) Date of Patent: Mar. 1, 2022

(54) LASER MACHINING DEVICE AND CONTROL METHOD THEREFOR

(71) Applicant: Tokyo Seimitsu Co., Ltd., Tokyo (JP)

(72) Inventors: Takashi Shimanuki, Tokyo (JP); Masanobu Koyata, Tokyo (JP); Shuhei Oshida, Tokyo (JP)

(73) Assignee: TOKYO SEIMITSU CO., LTD., Tokyo (JP)

(*) Notice: Subject to any disclaimer, the term of this patent is extended or adjusted under 35 U.S.C. 154(b) by 0 days.

(21) Appl. No.: 17/313,636

(22) Filed: May 6, 2021

(65) Prior Publication Data

US 2021/0276121 A1    Sep. 9, 2021

Related U.S. Application Data

(63) Continuation of application No. PCT/JP2018/043035, filed on Nov. 21, 2018.

(30) Foreign Application Priority Data

Nov. 19, 2018  (JP) .............................. JP2018-216749

(51) Int. Cl.
*B23K 26/03* (2006.01)
*B23K 26/53* (2014.01)
*B23K 26/08* (2014.01)

(52) U.S. Cl.
CPC .......... *B23K 26/03* (2013.01); *B23K 26/0869* (2013.01); *B23K 26/53* (2015.10)

(58) Field of Classification Search
CPC .. B23K 26/03; B23K 26/032; B23K 26/0869; B32K 26/53
See application file for complete search history.

(56) References Cited

U.S. PATENT DOCUMENTS

| 5,446,565 A | 8/1995 | Komma et al. |
| 2005/0134868 A1 | 6/2005 | Nagai |

(Continued)

FOREIGN PATENT DOCUMENTS

| CN | 1629625 A | 6/2005 |
| CN | 102398114 A | 4/2012 |

(Continued)

OTHER PUBLICATIONS

Decision of Refusal in JP2018-246900 drafted Sep. 3, 2019.

(Continued)

*Primary Examiner* — Geoffrey S Evans
(74) *Attorney, Agent, or Firm* — Birch, Stewart, Kolasch & Birch, LLP

(57) ABSTRACT

A laser machining device which condenses a laser light inside a wafer and forms modified regions in a plurality of layers in the wafer, includes an infrared imaging optical system configured to face one surface of the wafer. In a case where a modified region positioned on a side of another surface opposite to the one surface of the wafer is defined as a first modified region and another modified region is defined as a second modified region, among the modified regions in the plurality of layers, the infrared imaging optical system has a focusing range that includes the first modified region and the another surface, and simultaneously images the first modified region and the another surface, and the second modified region is positioned outside the focusing range.

14 Claims, 17 Drawing Sheets

(56) References Cited

U.S. PATENT DOCUMENTS

| | | | |
|---|---|---|---|
| 2012/0061361 A1 | 3/2012 | Usuda et al. | |
| 2016/0039044 A1* | 2/2016 | Kawaguchi | B23K 26/364 |
| | | | 219/121.69 |
| 2016/0078612 A1 | 3/2016 | Kodama | |
| 2017/0120374 A1 | 5/2017 | Hendricks et al. | |
| 2020/0208888 A1 | 7/2020 | Mogi et al. | |

FOREIGN PATENT DOCUMENTS

| | | | |
|---|---|---|---|
| CN | 103372721 A | | 10/2013 |
| CN | 106536119 A | | 3/2017 |
| JP | 7-98431 A | | 4/1995 |
| JP | 2004-111426 A | | 4/2004 |
| JP | 2005109324 A | * | 4/2005 |
| JP | 2005-169407 A | | 6/2005 |
| JP | 2008-281497 A | | 11/2008 |
| JP | 2009-85719 A | | 4/2009 |
| JP | 2011-187479 A | | 9/2011 |
| JP | 2012-59986 A | | 3/2012 |
| JP | 2013-230478 A | | 11/2013 |
| JP | 2015-95497 A | | 5/2015 |
| JP | 2016-21519 A | | 2/2016 |
| JP | 2016-63029 A | | 4/2016 |
| JP | 2016-107334 A | | 6/2016 |
| JP | 2017-17098 A | | 1/2017 |
| JP | 2017-64746 A | | 4/2017 |
| JP | 2017069340 A | * | 4/2017 |
| JP | 2019-39579 A | | 3/2019 |
| JP | 2019-125599 A | | 7/2019 |

OTHER PUBLICATIONS

Decision of Refusal in JP2019-040658 drafted Sep. 3, 2019.
Decision of Refusal in JP2019-218860 drafted Jul. 10, 2020.
Decision to Grant a Patent in JP2018-246899 drafted Jan. 11, 2019.
Decision to Grant a Patent in JP2019-040658 drafted Dec. 18, 2019.
First Notice of Reasons for Refusal in JP2018-246900 drafted Jun. 14, 2019.
First Notice of Reasons for Refusal in JP2019-040658 drafted Jun. 17, 2019.
International Preliminary Report on Patentability (PCT/IPEA/409) in PCT/JP2018/043035 dated Dec. 2, 2019.
International Search Report for PCT/JP2018/043035 (PCT/ISA/210) dated Feb. 5, 2019.
Notice of Reasons for Refusal in JP2018-216749 drafted Dec. 3, 2018.
Notice of Reasons for Refusal in JP2019-218860 drafted Dec. 10, 2019.
Second Notice of Reasons for Refusal in JP2018-246900 drafted Jul. 23, 2019.
Second Notice of Reasons for Refusal in JP2019-040658 drafted Jul. 25, 2019.
Written Opinion of the International Searching Authority for PCT/JP2018/043035 (PCT/ISA/237) dated Feb. 5, 2019.
Chinese Office Action and Search Report for corresponding Chinese Application No. 201880099624.X, dated Sep. 17, 2021, with an English translation.

* cited by examiner

FIG.11
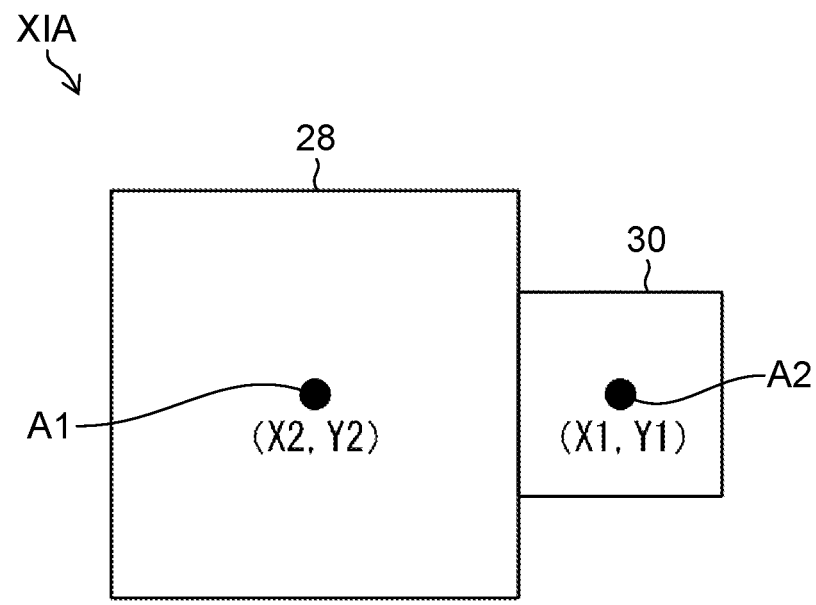
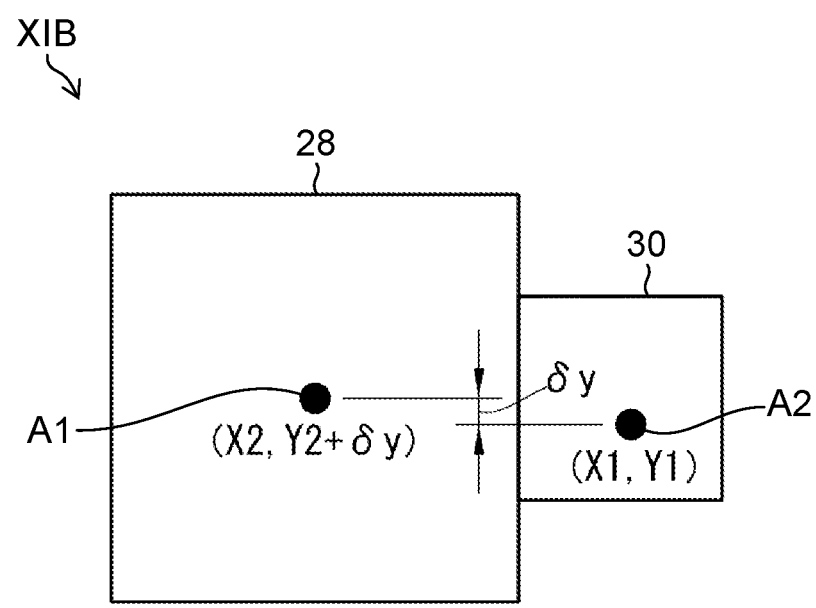

FIG.17
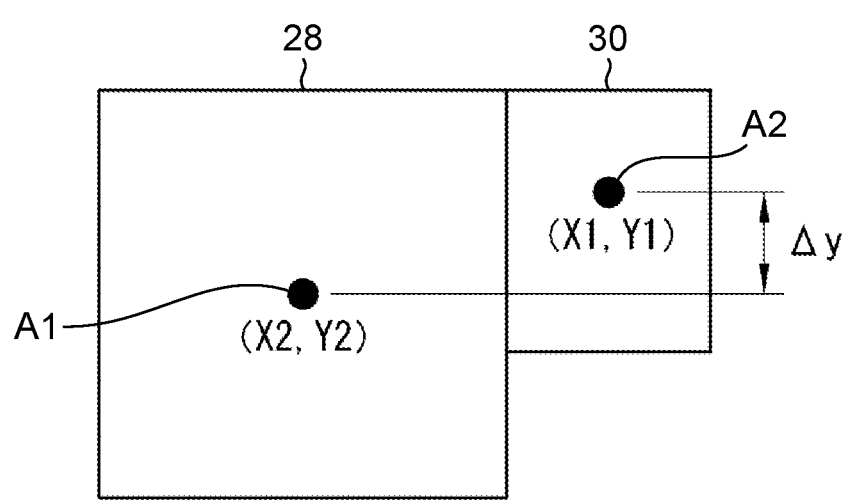
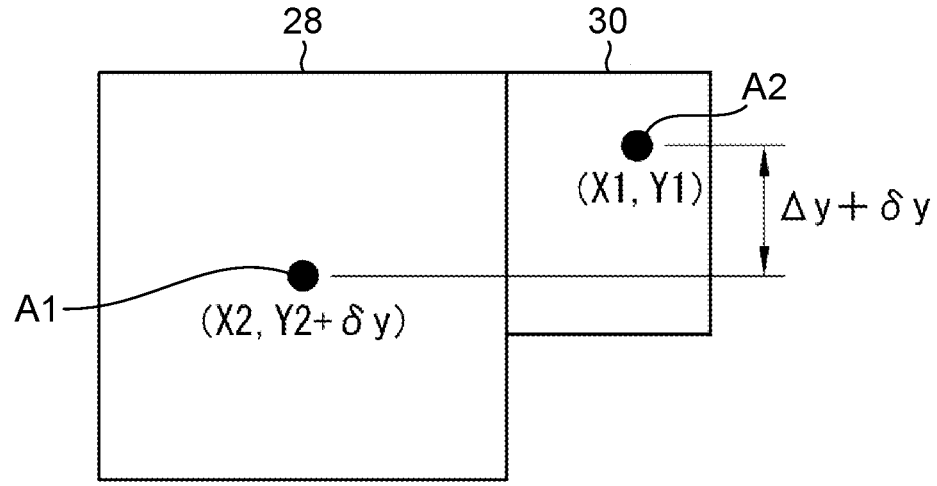

LASER MACHINING DEVICE AND CONTROL METHOD THEREFOR

CROSS-REFERENCE TO RELATED APPLICATIONS

The present application is a Continuation of PCT International Application No. PCT/JP2018/043035 filed on Nov. 21, 2018 claiming priority under 35 U.S.C § 119(a) to Japanese Patent Application No. 2018-216749 filed on Nov. 19, 2018. Each of the above applications is hereby expressly incorporated by reference, in its entirety, into the present application.

BACKGROUND OF THE INVENTION

1. Field of the Invention

The present invention relates to a laser machining device and a control method therefor for emitting laser light with its focusing point aligned at an internal portion of a wafer, to form modified regions inside the wafer along an intended dividing line on the wafer.

2. Description of the Related Art

Laser machining has been known as a machining method in which laser light is emitted with its focusing point aligned at an internal portion of a wafer having a front surface on which a plurality of devices are formed, and modified regions are formed inside the wafer along intended dividing lines on the wafer (see Japanese Patent Application Laid-Open No. 2016-107334, herein after referred to as "Patent Literature 1"). The wafer after the laser machining is divided into individual chips using each modified region as a start point by applying external stress.

As a laser machining device that performs such laser machining, there is a known device which includes: a laser unit (also referred to as a laser head) that emits laser light toward one surface of a wafer; and an infrared microscope that is fixed to the laser unit and captures an image of one surface of the wafer (see Japanese Patent Application Laid-Open No. 2016-21519, hereinafter referred to as "Patent Literature 2"). The laser machining device performs alignment detection in which an alignment reference on the wafer is imaged by the infrared microscope, and a position of an intended dividing line on the wafer (a relative position of the intended dividing line with respect to the infrared microscope) is detected based on the captured image obtained by the image-capturing, before modified regions are formed.

Next, based on the position detection result of the intended dividing line and known positional relationship information between an optical axis of the laser unit and an optical axis of the infrared microscope, the laser machining device performs alignment in which the optical axis of the laser unit is aligned at one end of the intended dividing line. Then, the laser light is emitted from the laser unit toward a focusing point in the wafer, and the laser unit and the wafer are relatively moved, thereby forming the modified regions in the wafer along the intended dividing line. Thereafter, the alignment and the formation of the modified region described above are repeatedly performed for each intended dividing line.

Japanese Patent Application Laid-Open No. 2004-111426 (hereinafter referred to as "Patent Literature 3") describes a laser machining device that obtains a positional deviation between a target value (theoretical value) and an actual measured value of an irradiation position of laser light emitted from a laser unit to a wafer. The laser machining device includes a test-piece mounting stage provided separately from a wafer stage that holds the wafer. After a test piece to be machined is mounted on the test-piece mounting stage, the laser light is emitted from the laser unit to a surface of the test piece to be machined to form a laser machining mark. Next, this laser machining mark is imaged by an observation optical system, and the positional deviation between the target value and the actual measured value of the irradiation position of the laser light is detected based on the captured image obtained through the imaging.

CITATION LIST

Patent Literature 1: Japanese Patent Application Laid-Open No. 2016-107334
Patent Literature 2: Japanese Patent Application Laid-Open No. 2016-21519
Patent Literature 3: Japanese Patent Application Laid-Open No. 2004-111426

SUMMARY OF THE INVENTION

By the way, in the laser machining device described in Patent Literature 2, the relative position between an optical axis of the laser unit and an optical axis of the infrared microscope may be deviated (shifted), when an environment such as a room temperature in a factory (clean room) to which the device is installed is changed, or the environment is temporally changed. In this case, a machining position of the laser light by the laser unit is positionally deviated with respect to the intended dividing line, whereby highly accurate machining cannot be performed. Therefore, in the conventional technology, a countermeasure has been performed to correct the positional deviation in periodic maintenance and so on. However, because a change in air temperature is large in some factories, the positional deviation may occur in a short period.

To prevent such positional deviation, it is desirable that the correction of the machining position of the laser light is performed at the time of forming the modified region. However, depending on a thickness of the wafer, scanning by the laser light needs to be performed a plurality of times with respect to one intended dividing line. In this case, meanderings of the modified region and cracks overlap a plurality of times, which makes it difficult to correct the machining position of the laser light. When a correction deviation of several $\mu m$ occurs, the yield is largely lowered in a narrow street process in which the width of an intended dividing line is less than or equal to 20 $\mu m$, for example.

Then, also in the laser machining device described in Patent Literature 2, it can be considered that the positional deviation between the target value and the actual measured value of the irradiation position of the laser light emitted from the laser unit to the wafer is detected in the same manner as Patent Literature 3 to obtain the positional relationship between the optical axis of the laser unit and the optical axis of the infrared microscope.

However, the method described in Patent Literature 3 targets a laser machining device in which an optical axis of the laser unit and an optical axis of the infrared microscope coincide with each other, and therefore the method described in Patent Literature 3 cannot simply be applied to the laser machining device described in Patent Literature 2. Even if application is achieved, there is a problem that labor and cost for preparing the test piece to be machined and labor and cost for attaching or detaching the test piece to be machined to or from the test-piece mounting stage are needed.

The present invention has been made in consideration of such a situation, and aims to provide a laser machining device and a control method therefor, which can easily perform highly accurate laser machining of a wafer.

In order to achieve the object of the present invention, in a laser machining device including: a laser optical system that emits laser light toward one surface of a wafer; an infrared imaging optical system that is disposed at a position facing the one surface, has a second optical axis different from a first optical axis of the laser optical system and images the wafer; and a relative motion mechanism that relatively moves the laser optical system and the infrared imaging optical system in an integrated manner with respect to the wafer, the laser machining device causing the relative motion mechanism to relatively move the laser optical system along an intended dividing line of the wafer with respect to the wafer in a state where the laser light of the laser optical system is focused on an internal portion of the wafer to perform laser machining for forming a modified region in the wafer along the intended dividing line, the laser machining device comprises: a detection controller configured to cause the infrared imaging optical system to image an alignment reference of the wafer, and detect positions of a plurality of intended dividing lines of the wafer based on a first captured image of the alignment reference imaged by the infrared imaging optical system; a laser machining controller configured to drive the laser optical system and the relative motion mechanism to perform the laser machining, based on a position detection result of each of the plurality of intended dividing lines by the detection controller and positional relationship information between the first optical axis and the second optical axis; an imaging controller configured to drive the relative motion mechanism to move each of the plurality of intended dividing lines into an imaging range of the infrared imaging optical system, and cause the infrared imaging optical system to capture a second captured image of each of the plurality of intended dividing lines in a state where the infrared imaging optical system is focused on another surface opposite to the one surface of the wafer; an arithmetic operation unit configured to arithmetically operate a positional deviation between a theoretical value and an actual measured value of a formation position of the modified region based on the positional relationship information and the second captured image; and a correction unit configured to correct the positional relationship information based on an arithmetic operation result of the arithmetic operation unit, wherein the laser machining controller forms the modified region in a focusing range of the infrared imaging optical system in a state where the infrared imaging optical system is focused on the another surface in a thickness direction of the wafer.

According to the laser machining device, even in a case where the relative position between the first optical axis of the laser optical system and the second optical axis of the infrared imaging optical system is deviated from a design value, due to, for example, a change in environment, the positional relationship information between the first optical axis of the laser optical system and the second optical axis of the infrared imaging optical system can be corrected.

In the laser machining device according to another aspect of the present invention, in a case where the correction unit corrects the positional relationship information, the laser machining controller performs the laser machining for each of the plurality of intended dividing lines before the laser machining based on a position detection result of each of the plurality of intended dividing lines by the detection controller and the positional relationship information corrected by the correction unit. Thus, the modified region can be formed in the wafer along each of the intended dividing lines with high accuracy.

In the laser machining device according to another aspect of the present invention, the laser machining controller performs the laser machining a plurality of times in which focusing positions of the laser light are different from each other in the thickness direction for each of the plurality of intended dividing lines, and forms multiple layers of the modified region for each of the plurality of intended dividing lines, and a first modified region located on a side closest to the another surface in the multiple layers of the modified region is within the focusing range. Thus, the arithmetic operation unit can recognize the first modified region in the second captured image.

In the laser machining device according to another aspect of the present invention, in a case where a modified region different from the first modified region in the multiple layers of the modified region is defined as a second modified region, the laser machining controller forms the second modified region outside the focusing range in the thickness direction. Thus, it is possible to prevent the second modified region from affecting the detection of the first modified region.

In the laser machining device according to another aspect of the present invention, in a case where a modified region different from the first modified region in the multiple layers of the modified region is defined as a second modified region, the laser machining controller forms the first modified region over an entire range of the intended dividing line and forms the second modified region in a range excluding a specific region of an outer periphery of the wafer in the entire range, and the imaging controller drives the relative motion mechanism to move the specific region into an imaging range of the infrared imaging optical system, and causes the infrared imaging optical system to image the specific region in a state where the infrared imaging optical system is focused on the another surface. Thus, it is possible to improve detection accuracy of the actual measured value of the formation position of the first modified region, whereby the positional relationship information can be corrected with higher accuracy.

In the laser machining device according to another aspect of the present invention, in a case where a metal pattern is formed on each of the plurality of intended dividing lines of the another surface, and a region in which the metal pattern is formed in each of the plurality of intended dividing lines is defined as a pattern formation region, the imaging controller drives the relative motion mechanism to move the pattern formation region so as to come into the imaging range of the infrared imaging optical system, and causes the infrared imaging optical system to image the pattern formation region in a state where the infrared imaging optical system is focused on the another surface. Thus, it is possible to improve contrast of the modified region, thereby improving the detection accuracy of the actual measured value of the formation position of the modified region. As a result, the positional relationship information can be corrected with higher accuracy.

The laser machining device according to another aspect of the present invention includes a repeating controller that repeatedly operates at least the laser machining controller, the imaging controller, the arithmetic operation unit, and the correction unit for each direction of each of the plurality of intended dividing lines, for each wafer, or for each of a plurality of wafers. Thus, it is possible to correct the positional relationship information at a predetermined timing.

In the laser machining device according to another aspect of the present invention, the detection controller drives the relative motion mechanism to relatively move the infrared imaging optical system to an imaging position of the alignment reference, and causes the infrared imaging optical system to image the alignment reference, to obtain the first captured image. Thus, it is possible to detect a position of each of the intended dividing lines.

In the laser machining device according to another aspect of the present invention, the infrared imaging optical system includes an epi-illumination light source that illuminates the wafer with infrared light using the second optical axis as an illumination axis.

To achieve the object of the present invention, in a control method of a laser machining device including: a laser optical system that emits laser light toward one surface of a wafer; an infrared imaging optical system that is disposed at a position facing the one surface, has a second optical axis different from a fist optical axis of the laser optical system and images the wafer; and a relative motion mechanism that relatively moves the laser optical system and the infrared imaging optical system in an integrated manner with respect to the wafer, the laser machining device causing the relative motion mechanism to relatively move the laser optical system along an intended dividing line of the wafer with respect to the wafer in a state where the laser light of the laser optical system is focused on an internal portion of the wafer to perform laser machining for forming a modified region in the wafer along the intended dividing line, the control method includes: a detection step of causing the infrared imaging optical system to image an alignment reference of the wafer, and detecting positions of a plurality of intended dividing lines of the wafer based on a first captured image of the alignment reference imaged by the infrared imaging optical system; a laser machining step of driving the laser optical system and the relative motion mechanism to perform the laser machining based on a position detection result of each of the plurality of intended dividing lines in the detection step and positional relationship information between the first optical axis and the second optical axis, an imaging step of driving the relative motion mechanism to move each of the plurality of intended dividing lines into an imaging range of the infrared imaging optical system, and causing the infrared imaging optical system to capture a second captured image of each of the plurality of intended dividing lines in a state where the infrared imaging optical system is focused on another surface opposite to the one surface of the wafer; an arithmetic operation step of arithmetically operating a positional deviation between a theoretical value and an actual measured value of a formation position of the modified region based on the positional relationship information and the second captured image; and a correction step of correcting the positional relationship information based on an arithmetic operation result in the arithmetic operation step. In the laser machining step, the modified region is formed at a position within a focusing range of the infrared imaging optical system in a state where the infrared imaging optical system is focused on the another surface in a thickness direction of the wafer.

In the control method of the laser machining device according to another aspect on the present invention, in a case where the positional relationship information is corrected in the correction step, the laser machining is performed in the laser machining step for each of the plurality of intended dividing lines before the laser machining, based on a position detection result of each of the plurality of intended dividing lines in the detection step and the positional relationship information corrected in the correction step.

According to the present invention, highly accurate laser machining of a wafer can easily be performed.

BRIEF DESCRIPTION OF THE DRAWINGS

FIG. 11 is an explanation view for explaining correction of positional relationship information, the correction being performed by a correction unit.

FIG. 17 is an explanation view for explaining a modified example of a machining unit.

DESCRIPTION OF THE PREFERRED EMBODIMENTS

Configuration of Laser Machining Device of First Embodiment

Figure 1:
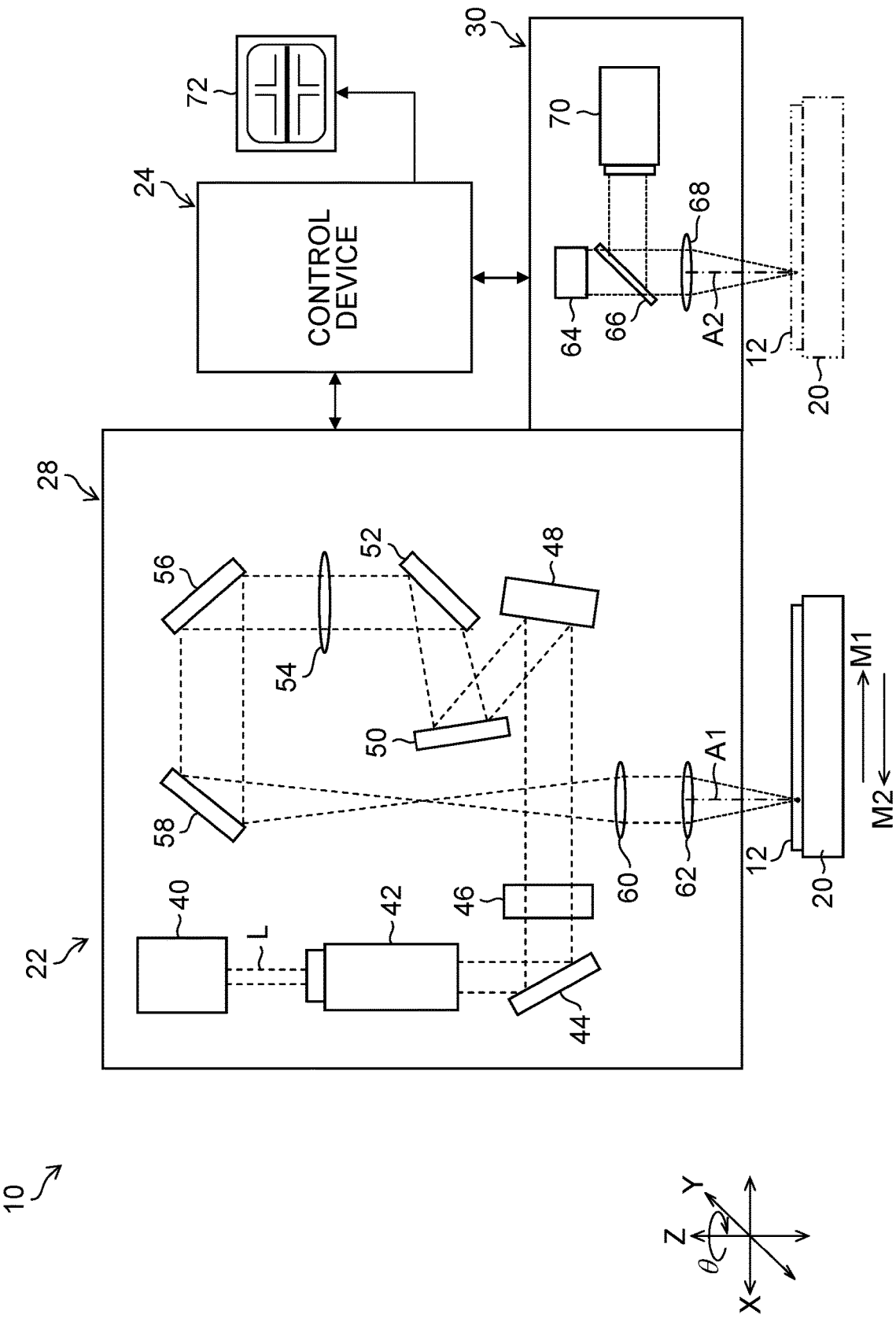
FIG. 1 is a schematic view of a laser machining device according to a first embodiment.

FIG. 1 is a schematic view of a laser machining device 10 according to a first embodiment. As illustrated in FIG. 1, the laser machining device 10 performs laser machining on a wafer 12 (for example, a silicon wafer), as a preceding process before the wafer 12 is divided into a plurality of chips 14 (see FIG. 2). Note that XYZ directions in the figure are orthogonal to each other, and among them, the X direction and the Y direction are horizontal directions, and the Z direction is a vertical direction (a thickness direction of the wafer 12). Further, a θθ direction is a rotation direction with the Z direction as a rotation axis.

Figure 2:
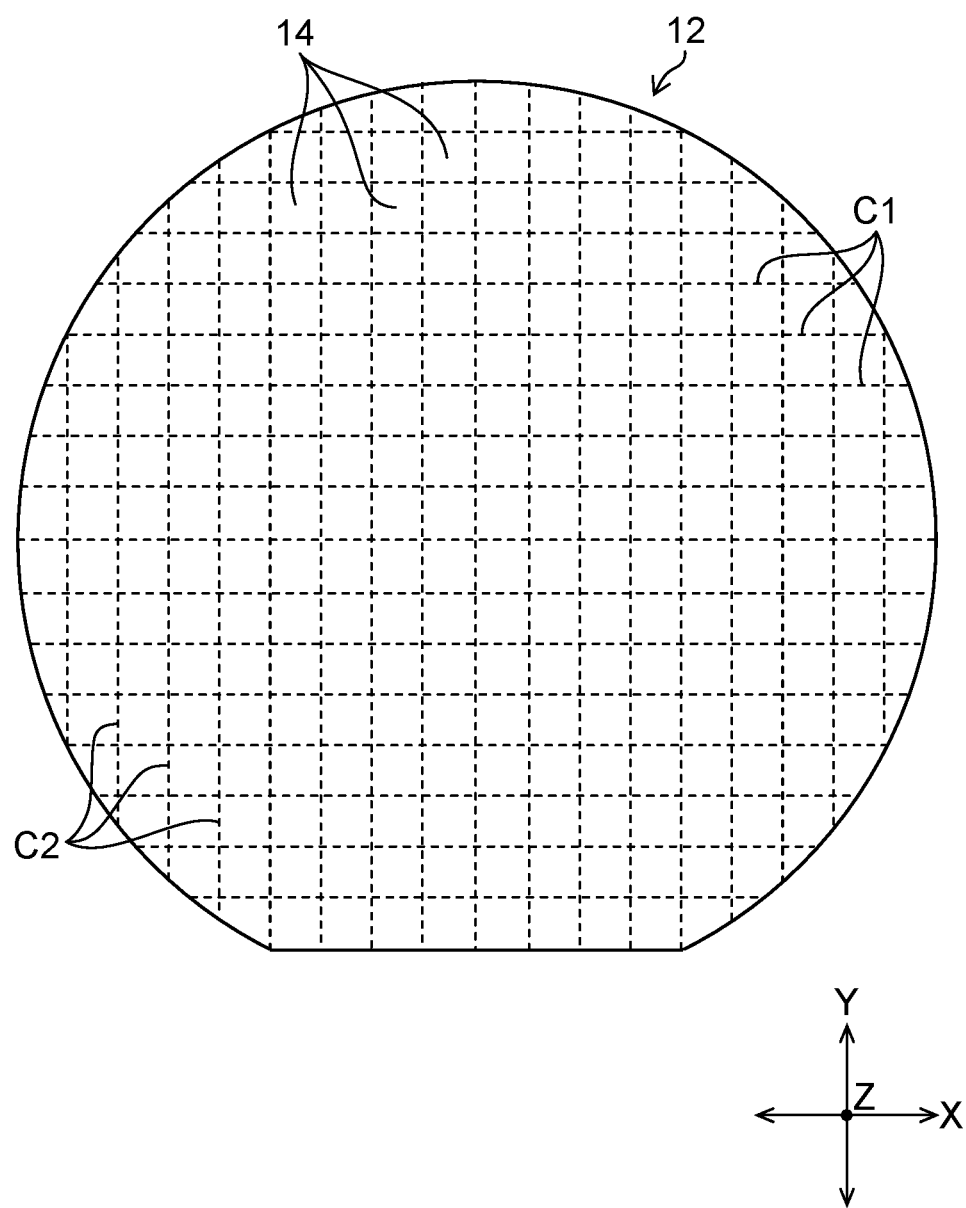
FIG. 2 is a plan view of a wafer to be machined by the laser machining device.
Figure 3:
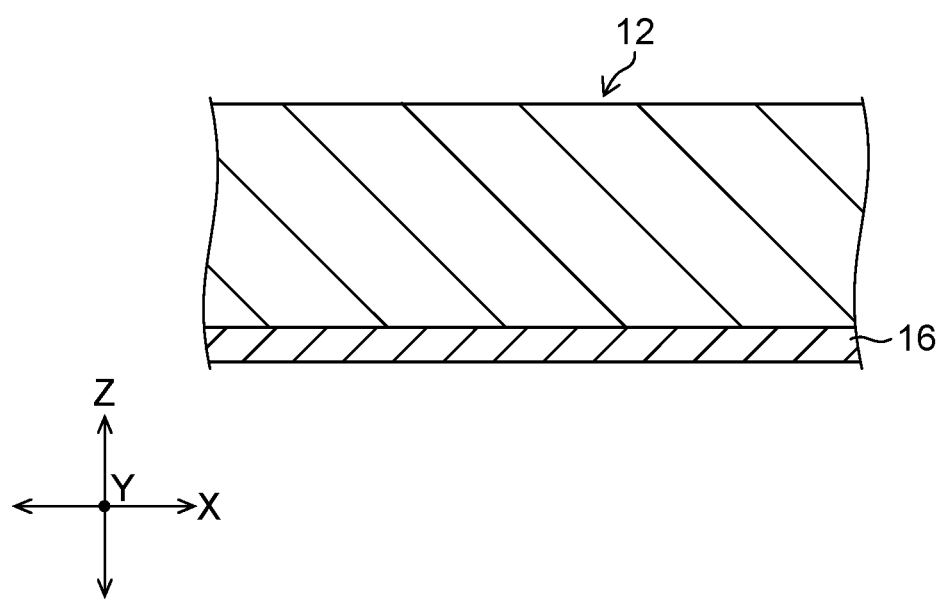
FIG. 3 is a cross sectional view of a part of the wafer illustrated in FIG. 2.

FIG. 2 is a plan view of the wafer 12 to be machined by the laser machining device 10. FIG. 3 is a cross sectional view of a part of the wafer 12 illustrated in FIG. 2. As shown in FIG. 2 and FIG. 3, the wafer 12 is divided into a plurality of regions by a plurality of streets 12S (see FIG. 10) arranged in a grid manner. Each of the divided regions includes a device layer 16 configuring a chip 14. The laser machining device 10 forms modified regions 200 (see FIG. 6) inside the wafer 12 along a plurality of intended dividing lines C1, C2 set on the streets 12S. Note that the intended dividing lines C1 and the intended dividing lines C2 are orthogonal to each other.

Returning to FIG. 1, the laser machining device 10 includes an Xθ stage 20, a machining unit 22, and a control device 24.

The Xθ stage 20 sucks and holds a front surface (right surface) on which the device layer 16 of the wafer 12 is provided, via a protection tape (not shown). With this configuration, the wafer 12 is held by the Xθ stage 20 such that a rear surface opposite to the front surface faces the machining unit 22, which will be described later. Therefore, the rear surface of the wafer 12 corresponds to one surface in the present invention, and the front surface of the wafer 12 corresponds to the other surface of the present invention.

Under control by the control device 24 to be described later, the Xθ stage 20 is moved in the X direction, and is rotated in the θ direction, by a stage drive mechanism 26 (see FIG. 4). Note that the stage drive mechanism 26 has a configuration in which a linear motion mechanism and a rotation mechanism, which are publicly known, are combined. A motion direction M1 is a motion direction in which the Xθ stage 20 moves toward one side in the X direction, and a motion direction M2 is a motion direction in which the Xθ stage 20 moves toward the other side in the X direction.

The machining unit 22 includes a laser unit 28 and an infrared microscope 30. This machining unit 22 is disposed above the Xθ stage 20 in the Z direction, and is controlled by the control device 24 to be described later.

Under control by the control device 24 to be described later, the machining unit 22 is moved in the Y direction and the Z direction, by a unit drive mechanism 32 (see FIG. 4). Note that the unit drive mechanism 32 configures a relative motion mechanism in the present invention together with the stage drive mechanism 26, and adopts a publicly-known linear motion mechanism.

The laser unit 28 corresponds to a laser optical system in the present invention, and emits laser light L toward the rear surface of the wafer 12. The laser unit 28 includes a laser light source 40, a beam expander 42, a mirror 44, a 2l2 wave plate 46, a spatial light modulator 48, a mirror 50, a mirror 52, a lens 54, a mirror 56, a mirror 58, a lens 60, and a focusing lens 62. Note that a configuration of the laser unit 28 is not limited to the configuration shown in FIG. 1, and may adopt configurations with various heads to be used in laser machining of the wafer 12.

The laser light source 40 emits the laser light L for laser machining of the wafer 12 toward the beam expander 42. Note that, a kind of the laser light L is a publicly-known technology (see Patent Literature 1, for example), so that a specific description will be omitted here.

The beam expander 42 expands the laser light L incident from the laser light source 40 so as to have an appropriate beam diameter used for phase modulation by the spatial light modulator 48 to be described later. The laser light L emitted from the beam expander 42 enters the spatial light modulator 48 via the mirror 44 and the λ/2 wave plate 46.

For the spatial light modulator 48, for example, a spatial light modulator (SLM) of reflection type liquid crystal (LCOS: liquid crystal on silicon) is used. Under control by the control device 24, the spatial light modulator 48 presents a predetermined hologram pattern, thereby modulating the laser light L incident from the λ/2 wave plate 46. With this configuration, aberration of the laser light L is corrected such that the aberration of the laser light L focused in the wafer 12 turns less than or equal to predetermined aberration. Note that a configuration and a function of the spatial light modulator 48 is a publicly-known technology (see Patent Literature 1), so that a specific description will be omitted here.

The laser light L modulated by the spatial light modulator 48 passes through the mirror 50, the mirror 52, the lens 54, the mirror 56, the mirror 58, and the lens 60, and then is focused by the focusing lens 62. The focusing lens 62 is positionally adjusted by a not-shown lens motion mechanism in the Z direction. Under control by the control device 24, the lens motion mechanism adjusts a position of a focusing point of the laser light L in the Z direction, by adjusting a position of the focusing lens 62 in the Z direction. Note that an optical axis A1 of the focusing lens 62 (laser unit 28) corresponds to a first optical axis of the present invention.

The infrared microscope 30 corresponds to an infrared imaging optical system of the present invention. This infrared microscope 30 is fixed to the laser unit 28, and moves integrally with the laser unit 28. The infrared microscope 30 includes an illumination light source 64, a half mirror 66, an object lens 68, an infrared camera 70, and the like.

The illumination light source 64 is an epi-illumination light source, and for example, an LD (laser diode) light source or an SLD (super luminescent diode) light source is used as the illumination light source 64. This illumination light source 64 outputs illumination light of a wavelength region transmitting through the wafer 12, for example, infrared light of an infrared region, toward the half mirror 66.

The half mirror 66 transmits a part of the illumination light incident from the illumination light source 64, and emits the light toward the object lens 68. With this configuration, the illumination light is focused on the rear surface of the wafer 12 by the object lens 68. A position of a focusing point of the illumination light, in the Z direction, focused by the object lens 68 is adjusted by moving the object lens 68 in the Z direction, by a not-shown lens motion mechanism. An optical axis A2 of the object lens 68 is an optical axis A2 of the infrared microscope 30 [an illumination axis of the illumination light source 64 and an imaging axis of the infrared camera 70 to be described later], and corresponds to a second optical axis of the present invention. Note that the optical axes A1, A2 are both parallel to the Z direction.

A part of reflection light of the illumination light reflected by the wafer 12 is reflected by the half mirror 66 toward the infrared camera 70.

The infrared camera 70 includes an imaging element (not shown) having sensitivity in the wavelength region of the infrared light. Based on a captured image obtained by imaging the wafer 12 by the infrared camera 70 which is focused on an internal portion of the wafer 12 by the object lens 68, a state of the internal portion of the wafer 12 can be confirmed. Further, based on the captured image obtained by imaging of the wafer 12 by the infrared camera 70 focused on the rear surface or the front surface of the wafer 12 by the object lens 68, a state of the rear surface or the front surface of the wafer 12 can be confirmed.

Image data of the captured image imaged by the infrared camera 70 is output to the control device 24. Based on the image data of the captured image input from the infrared camera 70, the control device 24 causes a monitor 72 to display the captured image of the internal portion, the rear surface, or the front surface of the wafer 12.

Note that, as the infrared camera 70, for example, it is preferable to use a camera (near-infrared camera) having high sensitivity in a near-infrared region (a wavelength region more than or equal to 1 µm), which is represented by an InGaAs (indium gallium arsenide) camera.

The optical axis A2 of the infrared microscope 30 is positioned on a downstream side in the motion direction M1 (one direction in the X direction) of the wafer 12 upon laser machining with respect to the position of the optical axis A1 of the laser unit 28. With this configuration, the infrared microscope 30 can image-capture the wafer 12 on the intended dividing lines C1, C2 corresponding to (identical to) those of the machining position of the wafer 12 by the laser light L of the laser unit 28.

[Configuration of Control Device]

Figure 4:
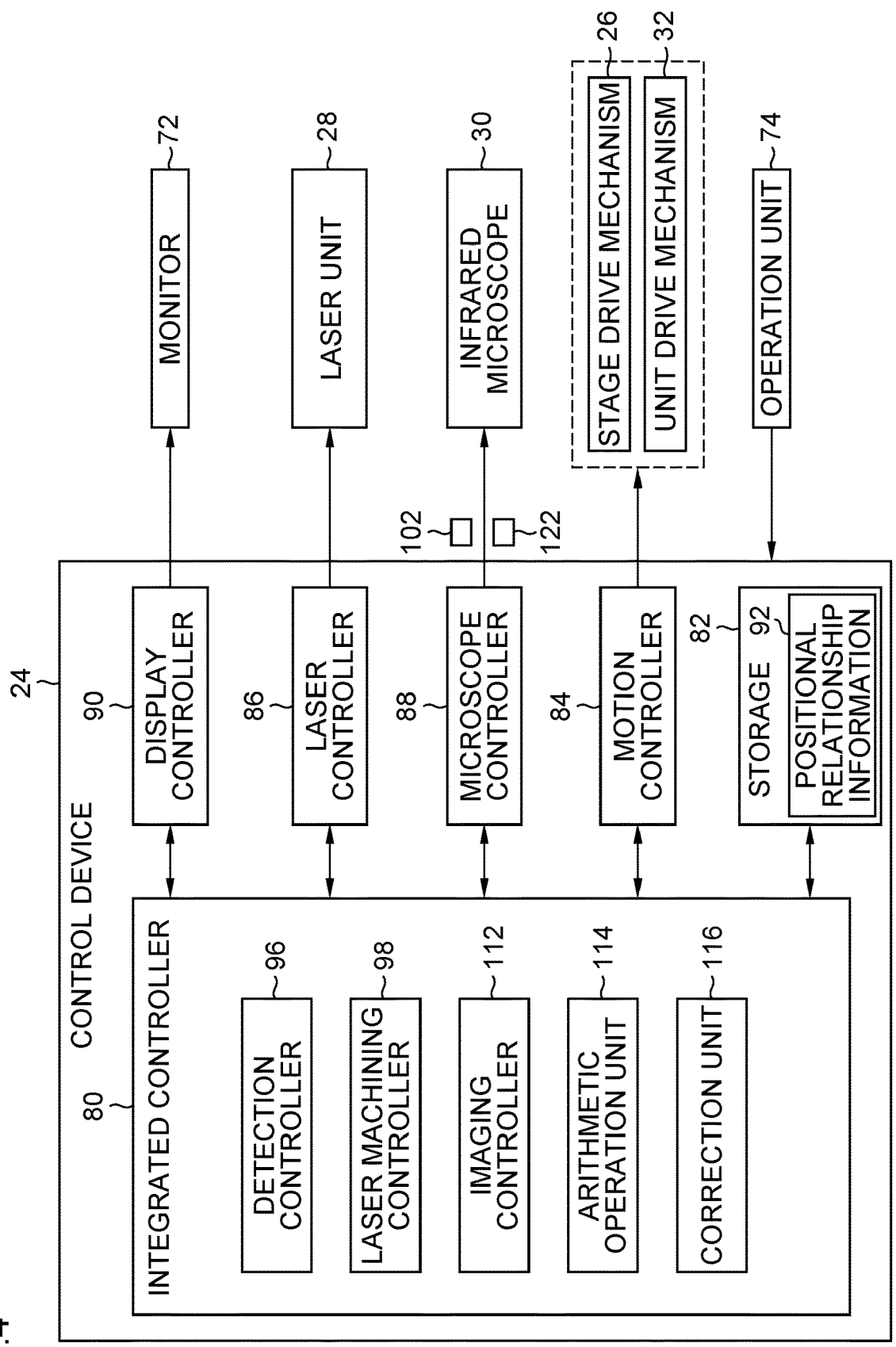
FIG. 4 is a functional block diagram of a control device.

FIG. 4 is a functional block diagram of the control device 24. As shown in FIG. 4, the control device 24 is connected with the stage drive mechanism 26, the laser unit 28 (the laser light source 40 and the spatial light modulator 48), the infrared microscope 30 (the illumination light source 64 and the infrared camera 70), the unit drive mechanism 32, the monitor 72, and an operation unit 74. Note that a keyboard, a mouse, and an operation button, which are publicly known, are used for the operation unit 74, for example.

The control device 24 is composed of an arithmetic operation device such as a personal computer, and includes an arithmetic operation circuit composed of various kinds of processors, a memory, and the like. The various kinds of processors include a CPU (central processing unit), a GPU (graphics processing unit), an ASIC (application specific integrated circuit), programmable logic devices [for example, SPLDs (simple programmable logic devices), a CPLD (complex programmable logic device), and an FPGAs (field programmable gate arrays)], and the like. Note that various functions of the control device 24 may be achieved by one processor, or may be achieved by a plurality of processors of the same kind or different kinds.

The control device 24 executes not-shown control programs to function as an integrated controller 80, a storage 82, a motion controller 84, a laser controller 86, a microscope controller 88, and a display controller 90. Hereinafter, in the embodiment, a part described as ". . . unit" may be referred to as ". . . circuit", ". . . device", or ". . . apparatus". In other words, the part described as ". . . unit" may include any of firmware, software, hardware, and a combination of those.

The integrated controller 80 integrally controls an operation of each part of the laser machining device 10 based on an input operation to the operation unit 74.

The storage 82 stores positional relationship information 92 in advance, in addition to the above-described control programs. The positional relationship information 92 is known information designating a relative positional relationship between a position (XY coordinates) of the optical axis A1 of the laser unit 28 and a position (XY coordinates) of the optical axis A2 of the infrared camera 70, in the XY directions. As the positional relationship information 92, a value measured by a manufacturer of the laser machining device 10 is stored. Further, the positional relationship information 92 is corrected (rewritten) by a correction unit 116 to be described later.

Under control of the integrated controller 80, the motion controller 84 separately (respectively) drives the stage drive mechanism 26 and the unit drive mechanism 32, thereby relatively moving the laser unit 28 and the infrared microscope 30 integrally in the XYZ directions and the θθ direction, with respect to the wafer 12. Thus, the optical axis A1 of the laser unit 28 can be aligned at a machining start position (one end of each of the intended dividing lines C1, C2) of the wafer 12 before laser machining, or the laser unit 28 can be relatively moved in the X direction with respect to the wafer 12 during laser machining. Further, the optical axis A2 of the infrared microscope 30 can be aligned at specific positions in the wafer 12 [for example, an alignment reference, the modified regions 200 for correction (see FIG. 6) to be described later, and so on] before laser machining.

Under control of the integrated controller 80, the laser controller 86 controls emission of the laser light L by the laser light source 40 and modulation of the laser light L by the spatial light modulator 48. Note that the modulation control of the laser light L by the spatial light modulator 48 is a publicly-known technology, so that a specific description will be omitted here.

Under control of the integrated controller 80, the microscope controller 88 controls the infrared microscope 30, that is, controls emission of illumination light by the illumination light source 64 and imaging of the wafer 12 by the infrared camera 70.

The display controller 90 controls display of the monitor 72. Based on the image data of the captured image of the wafer 12, which is input from the infrared camera 70 of the infrared microscope 30, the display controller 90 causes the monitor 72 to display the captured image. Further, the display controller 90 causes the monitor 72 to display various setting screens of the laser machining device 10.

The integrated controller 80 executes the above-described control programs so as to function as a detection controller 96, a laser machining controller 98, an imaging controller 112, an arithmetic operation unit 114, and the correction unit 116.

The detection controller 96 controls each unit of the laser machining device 10 so as to perform alignment detection that detects positions (including directions in an XY plane) of the intended dividing lines C1, C2 of the wafer 12 held on the Xθ stage 20.

The detection controller 96 first controls the stage drive mechanism 26, the unit drive mechanism 32 and the infrared microscope 30, via the motion controller 84 and the microscope controller 88, and obtains (images) the image data of the captured image 102 of the alignment reference of the wafer 12. The alignment reference described herein means a reference which is used by the laser machining device 10 in order to recognize the positions of the intended dividing lines C1, C2 of the wafer 12. As the alignment reference, for example, a publicly-known reference such as the street 12S (see FIG. 10) and a recognition mark (not shown) can be used. Note that the alignment reference may be provided at any position such as the internal portion, the front surface, and the rear surface of the wafer 12, as long as the infrared microscope 30 can image the alignment reference.

Specifically, in a case where the image data of the captured image 102 is obtained, the detection controller 96 drives the stage drive mechanism 26 and unit drive mechanism 32 so as to relatively move the infrared microscope 30 to an imaging position where the alignment reference of the wafer 12 can be imaged [a position where the alignment reference is included in an imaging range VA (see FIG. 9) of the infrared microscope 30]. After this motion, the detection controller 96 controls the infrared microscope 30, thereby causing the infrared microscope 30 to image the wafer 12 including the alignment reference. This allows the infrared microscope 30 to obtain the image data of the captured image 102 of the wafer 12, and to output the image data to the detection controller 96. Note that the captured image 102 corresponds to a first captured image of the present invention.

Then, based on the image data of the captured image 102, the detection controller 96 detects the alignment reference in the captured image 102 using a publicly-known image recognition method, thereby detecting the positions of the intended dividing lines C1, C2 of the wafer 12.

The laser machining controller 98 controls the stage drive mechanism 26, the unit drive mechanism 32, and the laser unit 28 via the motion controller 84 and the laser controller 86, to perform the laser machining for forming the modified regions 200 (see FIG. 6) in the wafer 12 along each of the intended dividing lines C1, C2, for each of the intended dividing lines C1, C2.

Specifically, based on the alignment detection result by the detection controller 96, the laser machining controller 98 rotates the Xθ stage 20 in the θ direction by driving the stage drive mechanism 26 via the motion controller 84, so that one of the intended dividing lines C1, C2 orthogonal to each other (for example, the intended dividing lines C1) becomes parallel to the X direction.

Next, the laser machining controller 98 starts forming a modified region 200 (see FIG. 6) corresponding to a first intended dividing line C1 among the plurality of intended dividing lines C1 parallel to the X direction. Based on the alignment detection result (the position detection result of the intended dividing line C1) by the detection controller 96 and the positional relationship information 92 in the storage 82, the laser machining controller 98 determines the relative positional relationship between the laser unit 28 (optical axis A1) and the intended dividing line C1.

Here, the alignment detection detects the relative positional relationship between the infrared microscope 30 (optical axis A2) and the intended dividing lines C1, C2. However, the positional relationship between the laser unit 28 (optical axis A1) and the infrared microscope 30 (optical axis A2) is already known based on the positional relationship information 92. Accordingly, based on the alignment detection result and the positional relationship information 92, the laser machining controller 98 can determine the relative positional relationship between the laser unit 28 (optical axis A1) and the intended dividing lines C1, C2.

As a result, based on the alignment detection result and the positional relationship information 92, the laser machining controller 98 drives the stage drive mechanism 26 and the unit drive mechanism 32 via the motion controller 84, so as to perform the alignment for aligning the optical axis A1 of the laser unit 28 at one end of the first intended dividing line C1, for example, one end on a side of the motion direction M2.

Figure 5:
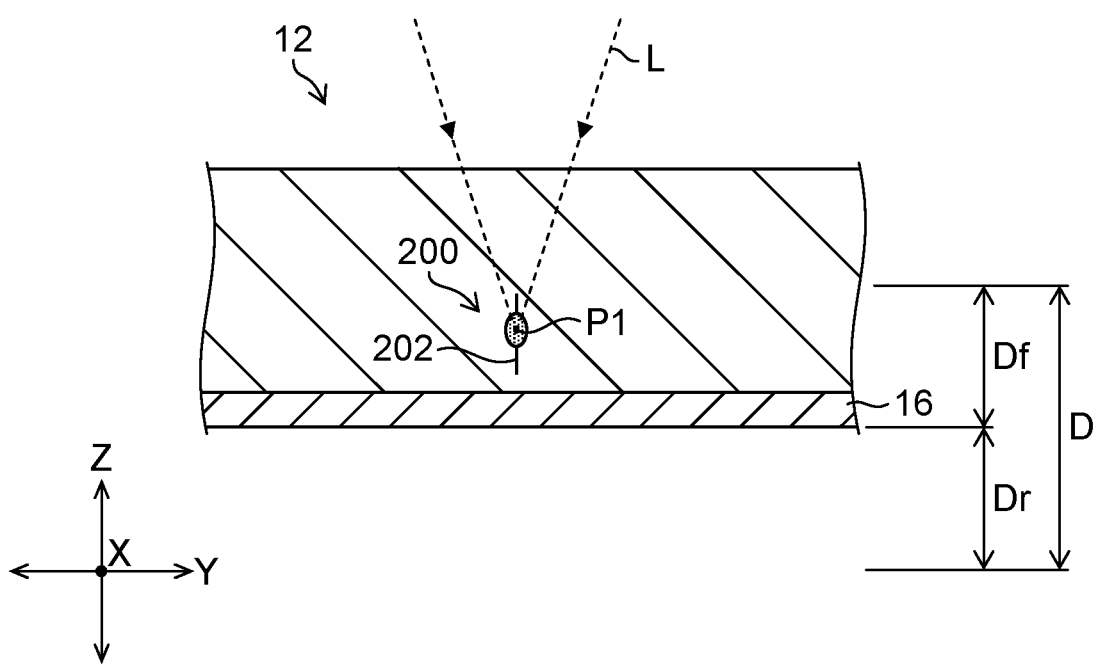
FIG. 5 is an explanation view for explaining formation of a modified region inside the wafer.
Figure 6:
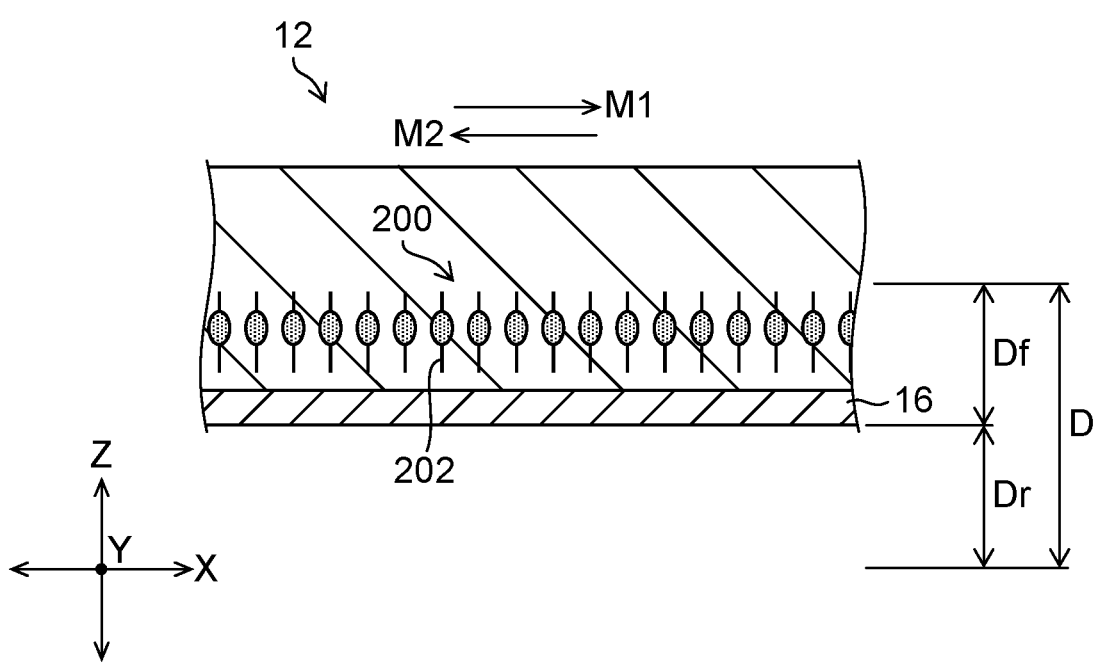
FIG. 6 is an explanation view for explaining the formation of modified regions inside the wafer.

FIG. 5 and FIG. 6 are explanation views for explaining formation of the modified region 200 inside the wafer 12. As shown in FIG. 5 and FIG. 6, after the alignment is completed, the laser machining controller 98 controls the laser unit 28 to focus the laser light L at a focusing point P1 at a predetermined depth position from the rear surface of the wafer 12, to form the modified region 200 at the position of the focusing point P1.

Next, the laser machining controller 98 drives the stage drive mechanism 26 via the motion controller 84, so as to move the Xθ stage 20 in the motion direction M2. With this configuration, the laser unit 28 is relatively moved in the motion direction M1 with respect to the wafer 12, while the laser light L is focused on the focusing point P1. In other words, the laser unit 28 is relatively moved in the X direction with respect to the wafer 12 along the first intended dividing line C1. As a result, the modified regions 200 are formed in the wafer 12 along the first intended dividing line C1. When the modified region 200 are formed, cracks 202 are generated so as to extend from the modified regions 200 as starting points in the thickness direction of the wafer 12 (Z direction).

At this time, the laser machining controller 98 forms the modified regions 200 in the vicinity of the front surface of the wafer 12 in the Z direction (the thickness direction of the wafer 12). The vicinity of the front surface of the wafer 12 described herein means a focusing range D of the infrared microscope 30 in the Z direction (in one halved range Df of the focusing range D on a side which is closer to the wafer 12) in a state where the infrared microscope 30 is focused on the front surface of the wafer 12. Note that a reference character Dr in the figure indicates the other one halved range of the focusing range D on a side opposite to the wafer 12.

The one halved range Df is basically a value obtained by multiplying a range of ½ of a depth of field (i.e., front-half depth of field) of the infrared microscope 30 by a refractive index n=3.6 to 4.0 of the wafer 12 (silicon). In addition, in this embodiment, the one halved range Df is a value which is obtained by adding the front-half depth of field (that is, the half depth of field on the front side) with a defocusing tolerance a outside the range of the depth of field, and then multiplying the result of the addition by the refractive index n. Here, the defocusing tolerance a is a range in which an image of the modified region 200 can be image-processed (recognized) in the captured image 122 to be described later, even in a case where the modified region 200 is deviated from the range of the front-half depth of field.

For example, in a case where a depth of field DOF of the infrared microscope 30 is assumed as 8.5 μm, the refractive index n is assumed as 4.0, and the defocusing tolerance a is assumed as 2 μm, the one halved range Df can be obtained by the following expression, Df=[DOF×(½)+a]×n=(8.5×0.5+2)×4=25 μm. Therefore, the laser machining controller 98 forms the modified regions 200 in a range of 25 μm from the front surface of the wafer 12 in the thickness direction of the wafer 12.

For example, in a case where the modified regions 200 form one layer, the laser machining controller 98 forms the modified regions 200 corresponding to the first intended dividing line C1, and then drives the unit drive mechanism 32 via the motion controller 84 so as to move the laser unit 28 toward a second intended dividing line C1 in the Y direction by a distance corresponding to a pitch interval between the intended dividing lines C1. After that, the optical axis A1 of the laser unit 28 is aligned at an end of the second intended dividing line C1, for example, one end on a side of the motion direction M1.

Then, the laser machining controller 98 controls the stage drive mechanism 26 and the laser unit 28 via the motion controller 84 and the laser controller 86, to focus the laser light L of the laser unit 28 at the focusing point P1 and move the Xθ stage 20 toward the motion direction M1. Thus, the modified regions 200 are formed in the wafer 12 along the second intended dividing line C1.

Hereinafter, the modified regions 200 are similarly formed in the wafer 12 along all intended dividing lines C1. Next, the laser machining controller 98 drives the stage drive mechanism 26 via the motion controller 84 to rotate the Xθ stage 20 by 90°, so that the intended dividing lines C2 become parallel to the X direction. Similar to the formation of the modified regions 200 corresponding to the intended dividing lines C1, the laser machining controller 98 controls the stage drive mechanism 26, the unit drive mechanism 32, and the laser unit 28 via the motion controller 84 and the laser controller 86, so that the modified regions 200 are formed in the wafer 12 along all the intended dividing lines C2. As a result, the formation of the modified regions 200 is completed.

Figure 7:
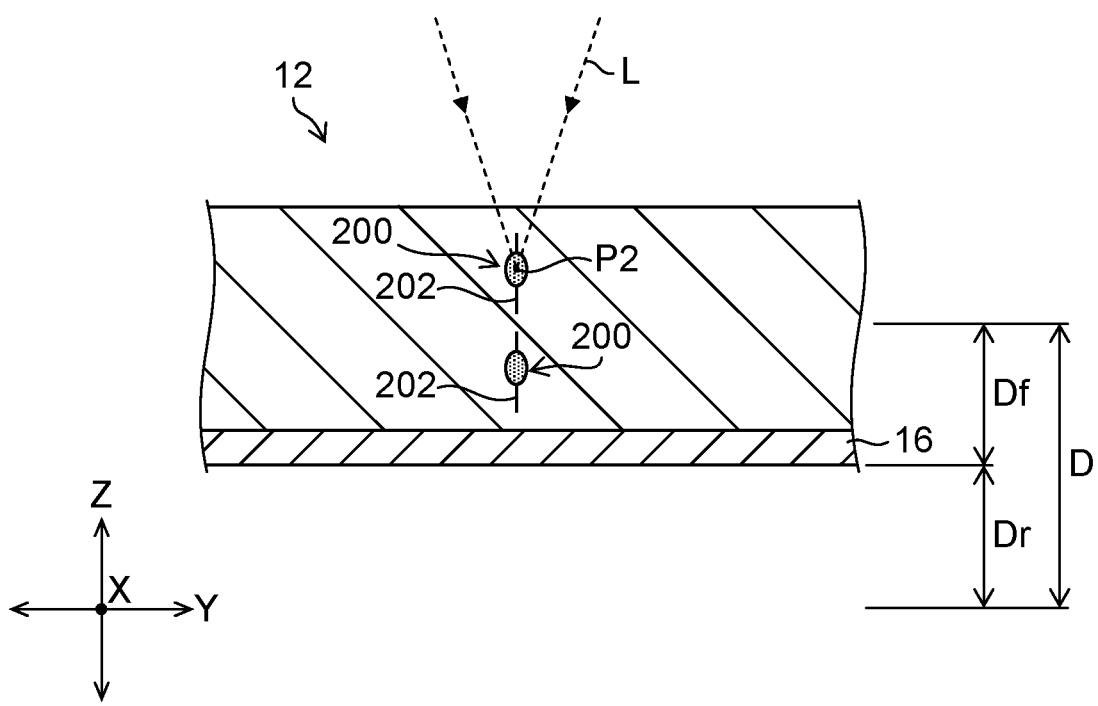
FIG. 7 is an explanation view for explaining formation of modified regions in two layers inside the wafer.
Figure 8:
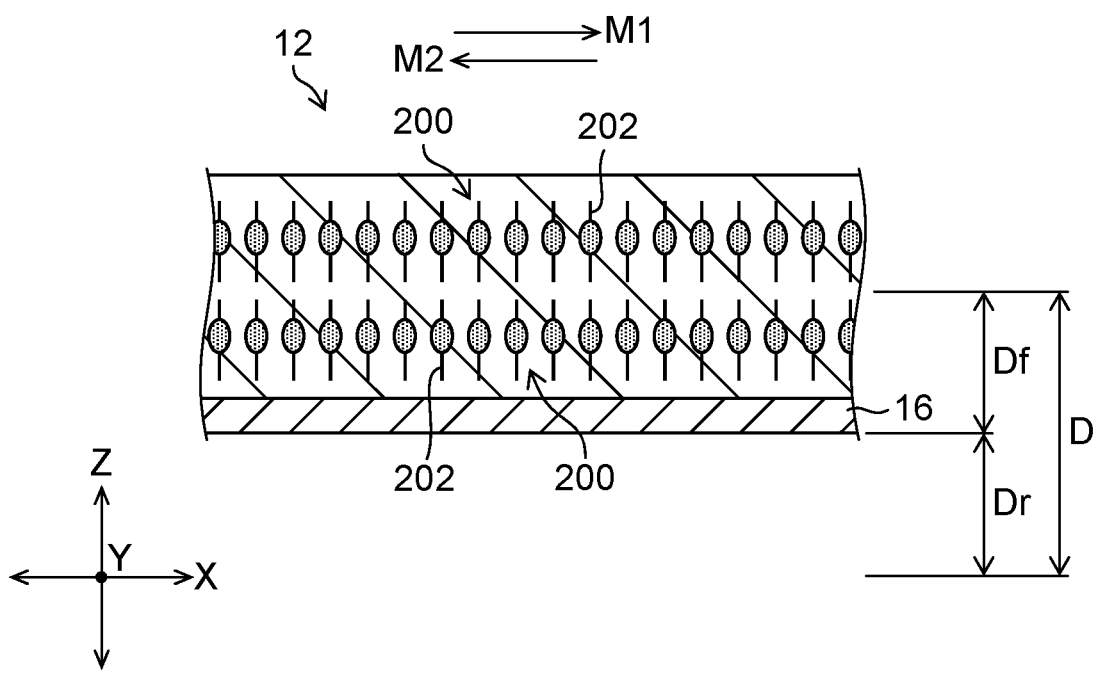
FIG. 8 is an explanation view for explaining the formation of modified regions in two layers inside the wafer.

FIG. 7 and FIG. 8 are explanation views for explaining formation of the modified regions 200 in two layers in the wafer 12. As shown in FIG. 7 and FIG. 8, in a case where the wafer 12 is thick, the laser machining controller 98 forms the modified regions 200 in, for example, two layers in the wafer 12 along the intended dividing lines C1, C2. In this case, the laser machining controller 98 successively forms the modified regions 200 in two layers for each of the intended dividing lines C1, C2.

Specifically, as explained with FIG. 5 and FIG. 6 described above, the laser machining controller 98 forms the modified regions 200 of a first layer corresponding to the first intended dividing line C1. Then, the laser machining controller 98 forms the modified regions 200 of a second layer in a repeated manner in a state where the focusing position of the laser light L of the laser unit 28 is changed at a focusing point P2 that is present inside the wafer 12 and is at a position shallower than the focusing point P1 in the wafer 12 (a position on an upper side in the Z direction). Thus, the modified regions 200 are formed in two layers along the first intended dividing line C1 in the wafer 12.

Note that, in this embodiment, in a case where the image 122 is captured by the infrared microscope 30, which will be described later, after the laser machining of the modified regions 200 of the second layer corresponding to the first intended dividing lines C1, C2, the modified regions 200 of the second layer are formed outside the range of the one halved range Df, that is, outside the focusing range D of the infrared microscope 30 in a state where the infrared microscope 30 is focused on the front surface of the wafer 12. Alternatively, in a case where the image 122 is captured by the infrared microscope 30, which will be described later, after the laser machining of the modified regions 200 of the first layer corresponding to the first intended dividing lines C1, C2 (before the laser machining of the modified regions 200 of the second layer), the modified regions 200 of the second layer may be formed inside the focusing range D.

With respect to other intended dividing lines C1, C2, the laser machining controller 98 similarly forms the modified regions 200 of the second layer for each of the intended dividing lines C1, C2. Note that, by repeating the laser machining a plurality of times according to the thickness of the wafer 12, the modified regions 200 may be formed in a plurality layers of three layers or more. Hereinafter, in this embodiment, the explanation will be made assuming that the modified regions 200 in two layers are formed for each of the intended dividing lines C1, C2. In this case, the modified region 200 of the first layer corresponds to a first modified region of the present invention, and the modified region 200 of the second layer corresponds to a second modified region of the present invention.

Returning to FIG. 4, the imaging controller 112, the arithmetic operation unit 114, and the correction unit 116 correct the positional relationship information 92 in the storage 82.

As described above, in a case where an environment such as a room temperature in a factory (clean room) to which the laser machining device 10 is installed is changed, or the environment is temporally changed, a relative position between the optical axis A1 of the laser unit 28 and the optical axis A2 of the infrared camera 70 may be deviated (shifted). In this case, an actual positional relationship between the optical axis A1 and the optical axis A2 may be deviated from the positional relationship between the optical axis A1 and the optical axis A2 defined by the positional relationship information 92. Particularly, in a case where the positional relationship between the optical axis A1 and the optical axis A2 is deviated in the Y direction, the optical axis A1 of the laser unit 28 cannot be precisely aligned on the intended dividing lines C1, C2 based on the initial positional relationship information 92 (at the time of shipment). As a result, machining accuracy of the laser machining is deteriorated.

Then, in this embodiment, the positional relationship information 92 is corrected (updated) based on the formation position of the modified region 200 of the first layer (hereinafter, referred to as the modified region 200 for correction) corresponding to each of the first intended dividing lines C1, C2. Here, the positional relationship between the optical axis A1 of the laser unit 28 and the optical axis A2 of the infrared camera 70 may be deviated in not only the Y direction but also the X direction. However, the deviation of the positional relationship between the optical axis A1 and the optical axis A2 in the X direction hardly affects the machining accuracy of the laser machining of the wafer 12 along the intended dividing lines C1, C2. Therefore, in this embodiment, the deviation of the positional relationship between the optical axis A1 and the optical axis A2 in the Y direction is detected based on the formation position of the modified region 200 for correction, and the positional relationship information 92 is corrected (updated) in the Y direction based on the detection result of the deviation.

Figure 9:
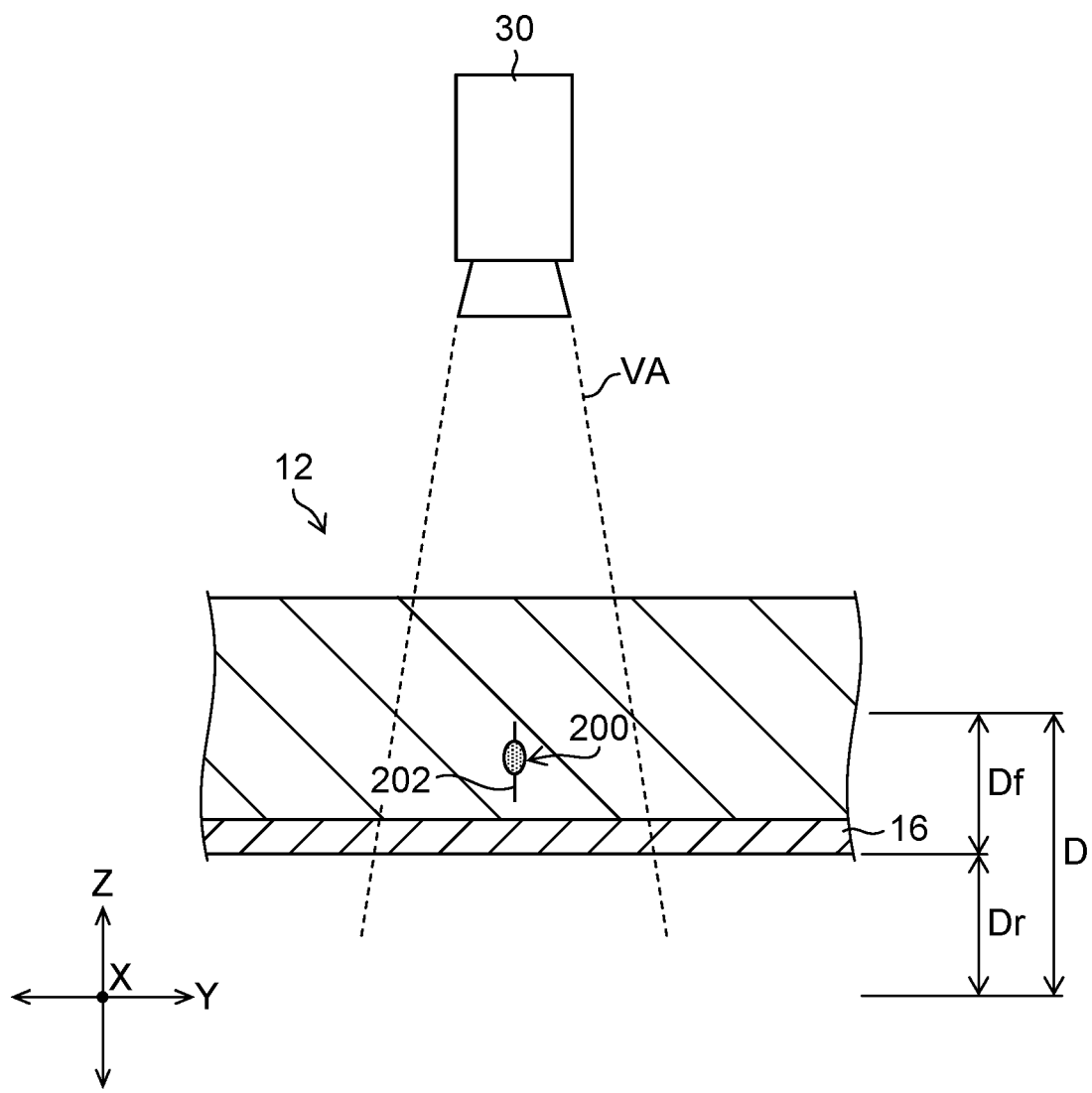
FIG. 9 is an explanation view for explaining imaging control of an infrared microscope by an imaging controller.

FIG. 9 is an explanation view for explaining imaging control of the infrared microscope 30 by the imaging controller 112. As shown in FIG. 9 and FIG. 4 described above, the imaging controller 112 controls capturing of the captured image 122 by the infrared microscope 30. The imaging controller 112 operates after the laser machining of the modified region 200 of the first layer (the modified region 200 for correction) corresponding to the first intended dividing line C1 (before the laser machining of the modified region 200 of the second layer), or after the laser machining of the modified region 200 of the second layer. Based on the position detection result of the first intended dividing line C1 by the detection controller 96, the imaging controller 112 drives the stage drive mechanism 26 and the unit drive mechanism 32 via the motion controller 84, to relatively move the first intended dividing line C1 of the wafer 12 so that the first intended dividing line C1 comes in the imaging range VA of the infrared microscope 30.

Next, the imaging controller 112 controls the infrared microscope 30, and causes the infrared microscope 30 to capture the image 122 of the first intended dividing line C1 (street 12S: see FIG. 10) in a state where the focus of the infrared microscope 30 is aligned at the front surface of the wafer 12. The captured image 122 corresponds to the second captured image of the present invention. Further, after the laser machining corresponding to the first intended dividing line C2, the imaging controller 112 similarly causes the infrared microscope 30 to capture the captured image 122 of the first intended dividing line C2 (street 12S).

Note that aligning the focus of the infrared microscope 30 at the front surface of the wafer 12 includes aligning the focus of the infrared microscope 30 at a tape surface of a protection tape (not shown) adhered to the front surface of the wafer 12. When a scratch, a foreign matter, a pattern, or the like on the tape surface of the protection tape is used as a target, the focus of the infrared microscope 30 can easily be aligned at the front surface of the wafer 12. A method for aligning the focus of the infrared microscope 30 at the front surface (a surface side opposite to the surface facing the infrared microscope 30) of the wafer 12 is not limited to the above-described method, and various publicly-known methods can be used.

Under control of the imaging controller 112, when the infrared microscope 30 images the first intended dividing lines C1, C2, the infrared microscope 30 outputs the image data of the captured images 122 of the intended dividing lines C1, C2 to the arithmetic operation unit 114.

At this time, as shown in FIG. 5 to FIG. 8 described above, the modified regions 200 of the first layer for each of the intended dividing lines C1, C2 are formed in the one halved range Df (in the focusing range D) of the infrared microscope 30 in a state where the focus is aligned at the front surface of the wafer 12. Therefore, the infrared microscope 30 performs imaging in a state where the focus is aligned at the front surface of the wafer 12, and at the same time, while simultaneously performing imaging in a state where the modified region 200 for correction is within the focusing range D. Because the modified region 200 for correction included in the captured image 122 is in focus, it is possible to recognize (identify) the modified region 200 for correction in the captured image 122.

Note that, in this embodiment, the first intended dividing lines C1, C2 are relatively moved so as to come into the imaging range VA of the infrared microscope 30, and then the focus of the infrared microscope 30 is aligned at the front surface of the wafer 12. However, the focus of the infrared microscope 30 is first aligned at the front surface of the wafer 12, and then the first intended dividing lines C1, C2 may be relatively moved so as to come into the imaging range VA.

Figure 10:
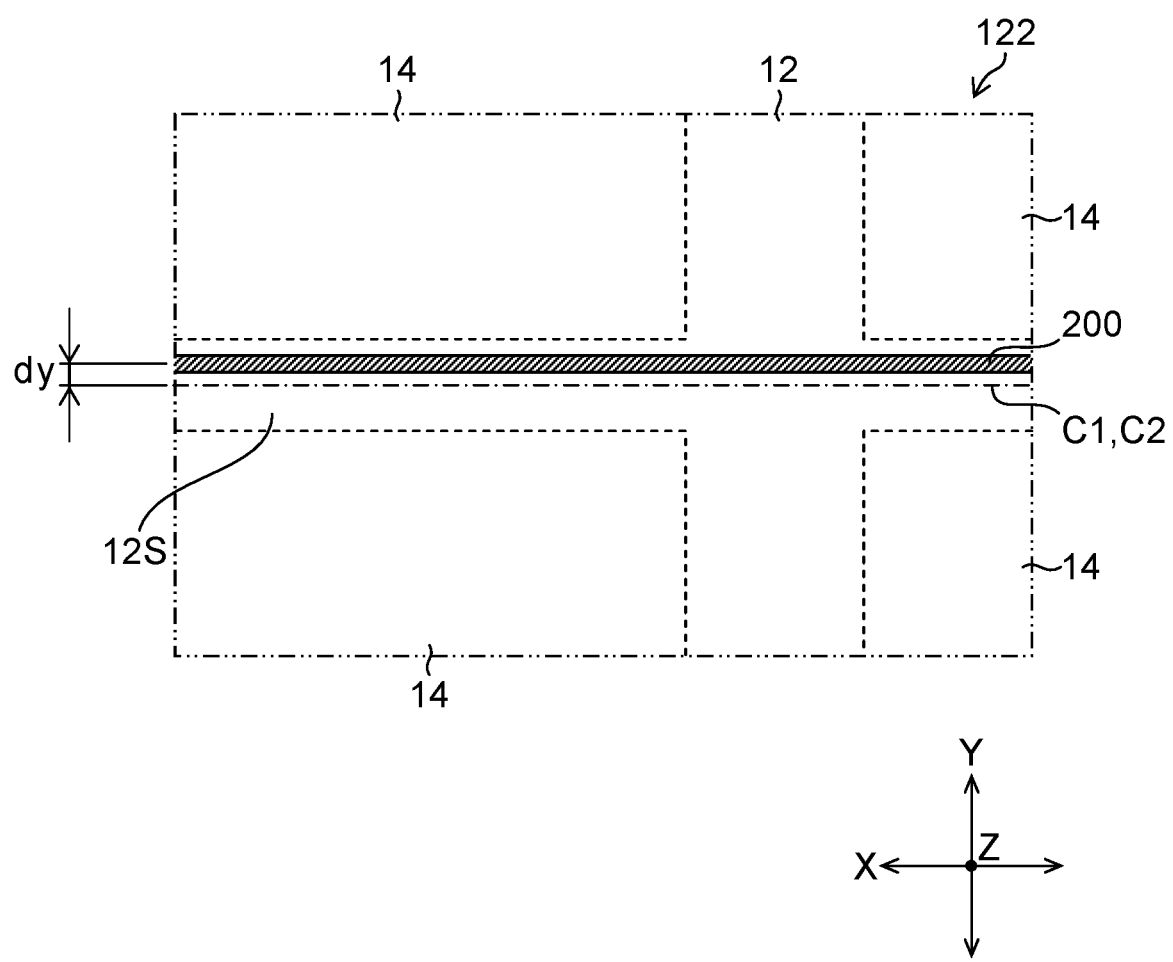
FIG. 10 is an explanation view for explaining an arithmetic operation by an arithmetic operation unit, of a positional deviation between a theoretical value and an actual measurement value of a formation position of a modified region for correction inside the wafer.

FIG. 10 is an explanation view for explaining an arithmetic operation, by the arithmetic operation unit 114, of a positional deviation between a theoretical value of the formation position of the modified region 200 for correction in the wafer 12 and an actual measured value of the formation position of the modified region 200 for correction. As shown in FIG. 10, based on the image data of the captured image 122, the arithmetic operation unit 114 detects the modified region 200 for correction (shaded area) in the captured image 122 by a publicly-known image recognition method. At this time, in a case where the image 122 is captured by the infrared microscope 30 after the laser machining of the modified region 200 of the first layer corresponding to the first intended dividing line C1, since the modified region 200 of the second layer is not present in the captured image 122, the modified region 200 and the cracks 202 of the second layer can be prevented from affecting the detection of the modified region 200 for correction. Further, even in a case where the image 122 is captured by the infrared microscope 30 after the laser machining of the modified region 200 of the second layer, since the modified region 200 of the second layer formed above the modified region 200 for correction is present outside the focusing range D of the infrared microscope 30, the modified region 200 and the cracks 202 of the second layer can be prevented from affecting the detection of the modified region 200 for correction.

Based on the position of the modified region 200 for correction in the captured image 122 and the position of the optical axis A2 of the infrared camera 70 when capturing the captured image 122, the arithmetic operation unit 114 detects the actual measured value of the formation position, in the Y direction, of the modified region 200 for correction in the wafer 12.

Further, the arithmetic operation unit 114 uses the position detection result, in the Y direction, of the first intended dividing lines C1, C2 by the detection controller 96, as the theoretical value of the formation position, in the Y direction, of the modified region 200 for correction in the wafer 12. The theoretical value is the formation position of the modified region 200 for correction in a case where it is assumed that there is no deviation between the positional relationship (in the Y direction) between the optical axis A1 of the laser unit 28 and the optical axis A2 of the infrared camera 70, which is defined by the positional relationship information 92, and actual positional relationship between the both.

Then, the arithmetic operation unit 114 arithmetically operates (δy) as a value designating the positional deviation in the Y direction (a deviation amount and a deviation direction of the positional deviation) between the theoretical value and the actual measured value of the formation position of the modified region 200 for correction. Note that amplitude of the value of (δy) designates the deviation amount of the positional deviation in the Y direction, and a sign of the value of (δy) designates the deviation direction of the positional deviation (a sign in the Y direction).

In a case where there is no deviation between the positional relationship, in the Y direction, between the optical axis A1 of the laser unit 28 and the optical axis A2 of the infrared camera 70, which is defined by the positional relationship information 92, and the actual positional relationship, in the Y direction, between the both, the arithmetic operation result (δy) of the positional deviation turns zero. Accordingly, the arithmetic operation result (δy) is a value that designates how much the positional relationship between the optical axis A1 and the optical axis A2 is changed from a design value in the Y direction.

FIG. 11 is an explanation view for explaining the correction of the positional relationship information 92 by the correction unit 116. In FIG. 11, coordinates (X1, Y1) are coordinates (design value) of the optical axis A2 of the infrared camera 70, and coordinates (X2, Y2) are coordinates (design value) of the optical axis A1 of the laser unit 28. Note that the coordinates (X1, Y1) and the coordinates (X2, Y2) are relative position coordinates of any one [for example, the coordinates (X1, Y1)] of the both, when the other [for example, the coordinates (X2, Y2)] is used as a reference. Note that, in this embodiment, Y1=Y2 is satisfied.

In a case where the arithmetic operation result (δy) of the positional deviation is not zero, the relative positional relationship between the optical axis A1 and the optical axis A2 is changed to a positional relationship designated by a reference character XIB in FIG. 11, from a positional relationship designated by the positional relationship information 92 at the time of factory shipment, which is designated by a reference character XIA in FIG. 11.

Accordingly, based on the arithmetic operation result (δy) of the positional deviation by the arithmetic operation unit 114, the correction unit 116 arithmetically operates an actual (newest) relative positional relationship between the position of the optical axis A1 of the laser unit 28 and the position of the optical axis A2 of the infrared camera 70 in the Y direction, thereby correcting the positional relationship information 92 in the storage 82. Therefore, based on the position detection result by the detection controller 96 and the positional relationship information 92 corrected by the correction unit 116, the laser machining controller 98 controls the laser unit 28, the stage drive mechanism 26, and the unit drive mechanism 32, to form the modified regions 200 in the wafer 12 along the second and subsequent intended dividing lines C1, C2.

Under control of the integrated controller 80, such correction of the positional relationship information 92, that is, the operation of each unit (the imaging controller 112, the arithmetic operation unit 114, and the correction unit 116) is performed at least at any one of timing selected from: for each direction of the intended dividing lines C1, C2; for each wafer 12; and for each of a plurality of wafers 12. Accordingly, the integrated controller 80 functions as a repeating controller of the present invention. Note that the correction of the positional relationship information 92 may be performed periodically or upon activating the laser machining device 10, for example.

[Action of Laser Machining Device]

Figure 12:
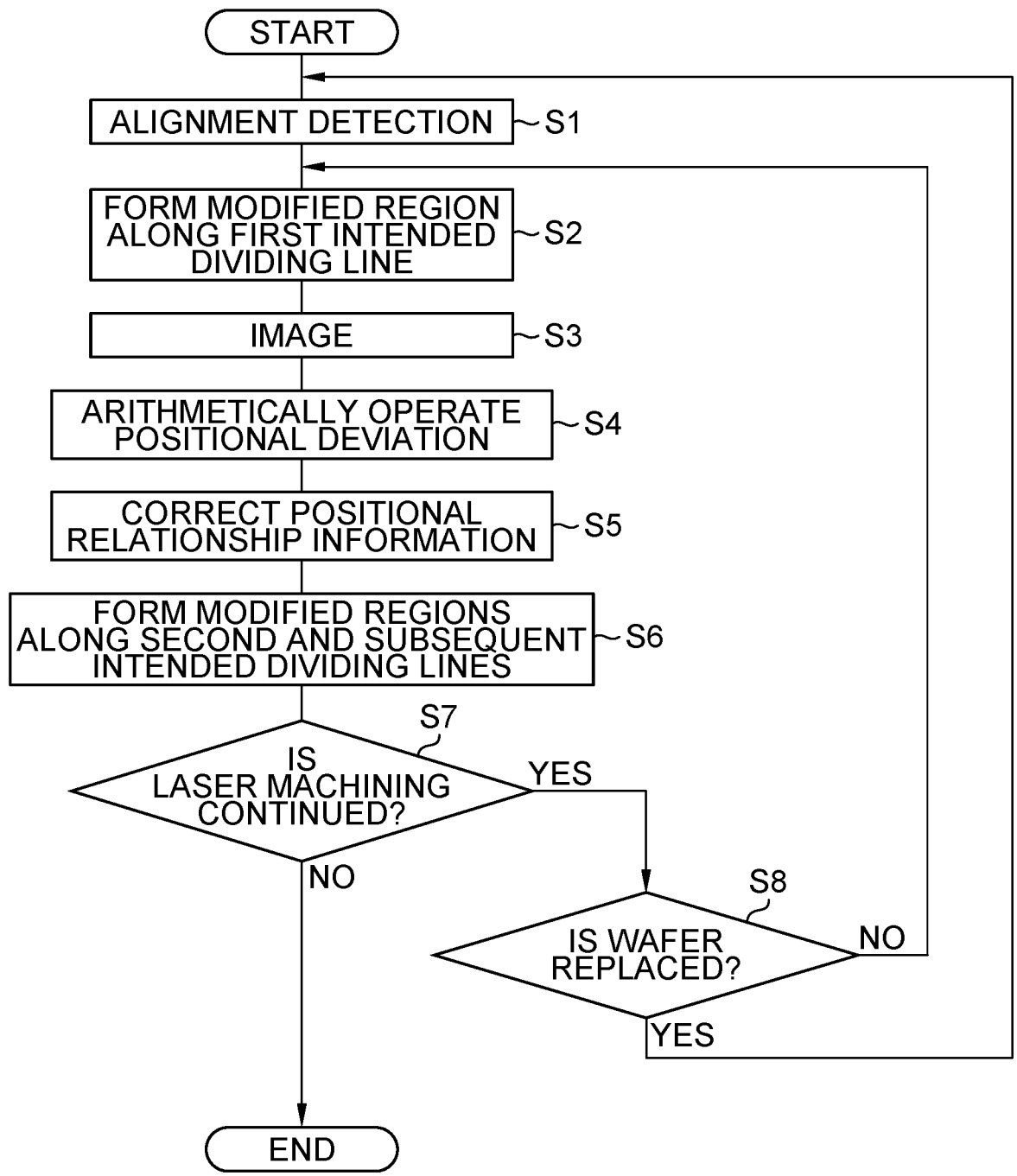
FIG. 12 is a flowchart illustrating a flow of a laser machining process of the wafer by the laser machining device, particularly a correction process of the positional relationship information.

FIG. 12 is a flowchart illustrating a flow of a laser machining process of the wafer 12 by the laser machining device 10 of the first embodiment having the above-described configuration, and particularly, a correction process of the positional relationship information 92 corresponding to a control method of the laser machining device of the present invention.

As illustrated in FIG. 12, when the wafer 12 to be laser-machined is sucked and held by the Xθ stage 20, the detection controller 96 of the control device 24 operates. The detection controller 96 controls the stage drive mechanism 26, the unit drive mechanism 32, and the infrared microscope 30, to obtain the image data of the captured image 102 of the alignment reference of the wafer 12. Then, based on the image data of the captured image 102, the detection controller 96 performs the alignment detection that detects the positions of the intended dividing lines C1, C2 in the wafer 12 (step S1, corresponding to a detection step of the present invention).

When the alignment detection is completed, the laser machining controller 98 operates. Based on the detection result of the positions of the intended dividing lines C1, C2 by the detection controller 96 and the positional relationship information 92 in the storage 82, the laser machining controller 98 drives the stage drive mechanism 26, the unit drive mechanism 32, and the laser unit 28, to perform the laser machining. Thus, the modified regions 200 of the first layer are formed in the wafer 12 along the first intended dividing line C1 (step S2, corresponding to a laser machining step of the present invention).

At this time, by the above-described laser machining, the modified region 200 of the first layer (the modified region 200 for correction) is formed, in the Z direction, in the focusing range D (in the one halved range Df) of the infrared microscope 30 in a state where the focus is aligned at the front surface of the wafer 12.

Next, based on the detection result of the positions of the intended dividing lines C1, C2 by the detection controller 96, the imaging controller 112 drives the stage drive mechanism 26 and the unit drive mechanism 32, thereby moving the first intended dividing line C1 (street 12S) into the imaging range VA of the infrared microscope 30, and the focus of the infrared microscope 30 is aligned at the front surface of the wafer 12. Then, the imaging controller 112 causes the infrared microscope 30 to image the first intended dividing line C1 (step S3, corresponding to an imaging step of the present invention). This causes the infrared microscope 30 to output the image data of the captured image 122 to the arithmetic operation unit 114.

Although illustration is omitted, when capturing of the captured image 122 by the infrared microscope 30 is completed, the laser machining controller 98 operates again, and drives the stage drive mechanism 26, the unit drive mechanism 32, and the laser unit 28 to perform the laser machining. This forms the modified region 200 of the second layer in the wafer 12 along the first intended dividing line C1. Note that step S3 may be performed after the laser machining of the modified region 200 of the second layer. In this case, the modified region 200 of the second layer is formed outside the focusing range D in the Z direction.

The arithmetic operation unit 114 operates according to input of the image data of the captured image 122 from the infrared microscope 30. Based on the image data of the captured image 122, the arithmetic operation unit 114 detects the modified region 200 for correction in the captured image 122 by the image recognition method. As described above, the modified region 200 for correction is formed in the focusing range D (in the one halved range Df) of the infrared microscope 30 in a state where the focus is aligned at the front surface of wafer 12, whereby the arithmetic operation unit 114 can detect the modified region 200 for correction in the captured image 122.

Here, in a case where step S3 is performed before the laser machining of the modified region 200 of the second layer, it can be prevented that the modified region 200 and the cracks 202 of the second layer are included in the captured image 122. Further, even in a case where step S3 is performed after the laser machining of the modified region 200 of the second layer, the modified region 200 of the second layer and the like are formed outside the focusing range D of the infrared microscope 30. Therefore, even in any case, it can be prevented that the modified region 200 and the cracks 202 of the second layer affect the detection of the modified region 200 for correction by the arithmetic operation unit 114.

Then, based on the position of the modified region 200 for correction in the captured image 122 and the position of the optical axis A2 of the infrared microscope 30 upon capturing the captured image 122, the arithmetic operation unit 114 detects the actual measured value of the formation position of the modified region 200 for correction in the wafer 12. Further, the arithmetic operation unit 114 obtains the detection result of the position of the first intended dividing line C1 detected when the detection controller 96 performs the alignment detection as the theoretical value of the formation position of the modified region 200 for correction in the wafer 12. As shown in FIG. 10 described above, the arithmetic operation unit 114 arithmetically operates the positional deviation between the theoretical value and the actual measured value of the modified region 200 for correction in the Y direction, and outputs the arithmetic operation result (δy) to the correction unit 116 (step S4, corresponding to an arithmetic operation step of the present invention).

When the arithmetic operation result (δy) of the positional deviation is input from the arithmetic operation unit 114, as shown in FIG. 11 described above, the correction unit 116 corrects the positional relationship information 92 in the storage 82 based on the arithmetic operation result (δy) (step S5, corresponding to a correction step of the present invention).

When the correction of the positional relationship information 92 is completed, the laser machining controller 98 operates again. Based on the alignment detection result by the detection controller 96 and the corrected positional relationship information 92 in the storage 82, the laser machining controller 98 drives the stage drive mechanism 26, the unit drive mechanism 32, and the laser unit 28, thereby starting the laser machining again. This forms the modified regions 200 in two layers in the wafer 12 along the (second and subsequent) intended dividing lines C1 before the laser machining as shown in FIG. 5 to FIG. 8 described above (step S6). Note that step S6 also corresponds to the laser machining step of the present invention.

The laser machining of the wafer 12 is performed based on the corrected positional relationship information 92. Therefore, even when the relative position between the optical axis A1 of the laser unit 28 and the optical axis A2 of the infrared camera 70 is deviated from the design value due to the change of the environment to which the laser machining device 10 is installed, the modified regions 200 can be formed in the wafer 12 with high accuracy along the second and subsequent intended dividing lines C1.

After the formation of the modified region 200 along each intended dividing line C1, the integrated controller 80 performs the repeating control that repeatedly operates the laser machining controller 98, the imaging controller 112, the arithmetic operation unit 114, and the correction unit 116 (YES in step S7, and NO in step S8). Thus, the processes from step S2 to step S6 that are already described are repeatedly performed. In other words, the formation of the modified region 200 in the wafer 12 along the first intended dividing line C2, the imaging of the first intended dividing line C2, the arithmetic operation of the positional deviation, re-correction of the positional relationship information 92, and the formation of the modified regions 200 corresponding to the second and subsequent intended dividing lines C2 are performed. Thus, the laser machining for one wafer 12 is completed.

In a case where the wafer 12 to be laser-machined is replaced, the processes from step S1 to step S7 that are already described are repeatedly performed (YES in step S7, and YES in step S8). Note that the processes from step S3 to step S5 may be performed for each of the plurality of wafers 12.

The wafer 12 after the laser machining is divided into a plurality of chips 14 by a publicly-known dividing device.

[Effects of this Embodiment]

As described above, the laser machining device 10 of this embodiment performs the formation of the modified region 200 for correction in the wafer 12, the capturing of the captured image 122 by the infrared microscope 30, and the arithmetic operation of the positional deviation between the theoretical value and the actual measured value of the formation position of the modified region 200 for correction, whereby the positional relationship information 92 can be corrected. As a result, even when the relative position between the optical axis A1 of the laser unit 28 and the optical axis A2 of the infrared microscope 30 is deviated from the design value due to the change of the environment to which the laser machining device 10 is installed, the deviation can be reflected in the positional relationship information 92.

As a result, regardless of the change of the environment to which the laser machining device 10 is installed, the modified region 200 can be formed in the wafer 12 with high accuracy along each of the intended dividing lines C1, C2. Further, it is unnecessary to provide the test piece to be machined or to attach or detach the test piece to be machined to or from the Xθ stage 20 as described in Patent Literature 3, whereby labor and cost can be reduced. As a result, highly accurate laser machining of the wafer 12 can easily be performed.

Second Embodiment

Figure 13:
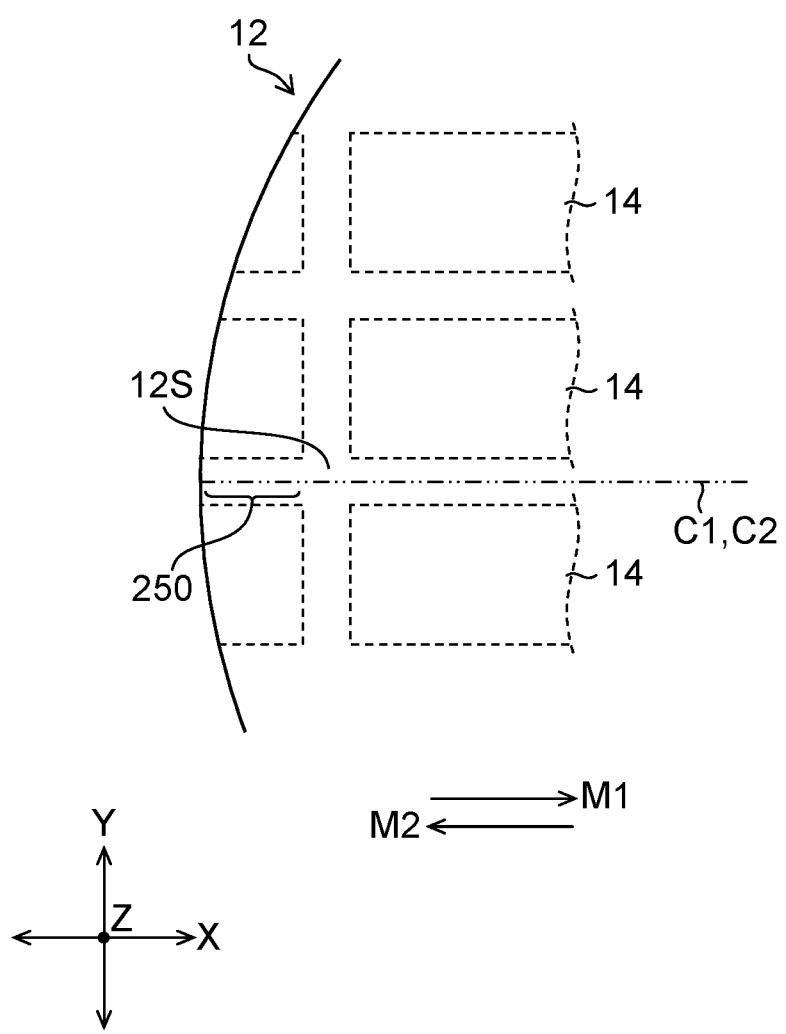
FIG. 13 is an explanation view for explaining laser machining of a wafer by a laser machining device according to a second embodiment.
Figure 14:
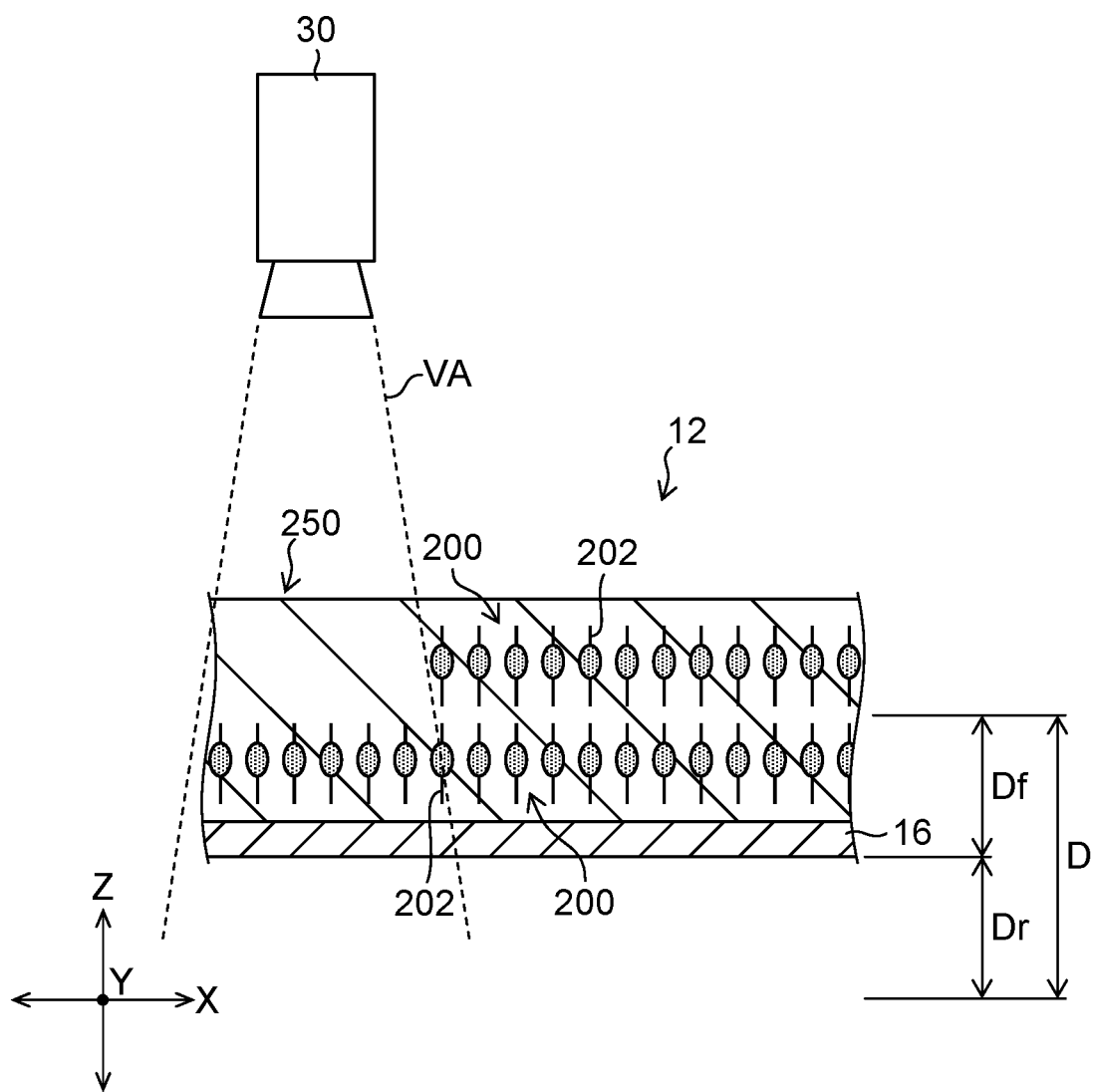
FIG. 14 is an explanation view for explaining the laser machining of the wafer by the laser machining device according to the second embodiment.

FIG. 13 and FIG. 14 are explanation views for explaining laser machining of the wafer 12 by a laser machining device 10 of a second embodiment. Note that, since the laser machining device 10 of the second embodiment basically has the same configuration as that of the laser machining device 10 of the first embodiment, the same functions or configurations as those in the first embodiment are attached by the same reference numerals, and a description thereof will be omitted. Note that, in the second embodiment, the captured image 122 is captured by the infrared microscope 30 after the laser machining of the modified region 200 of the second layer corresponding to the first intended dividing line C1.

As shown in FIG. 13 and FIG. 14, in the second embodiment, a formation method of the modified region 200 in the wafer 12 along the first intended dividing line C1 is different from the formation method in the first embodiment. A laser machining controller 98 of the second embodiment controls the stage drive mechanism 26, the unit drive mechanism 32, and the laser unit 28, thereby forming the modified region 200 of the first layer in the wafer 12 over an entire range of the first intended dividing line C1 similar to the above-described embodiment.

Next, the laser machining controller 98 controls the stage drive mechanism 26, the unit drive mechanism 32, and the laser unit 28, thereby forming the modified region 200 of the second layer in the wafer 12 in a range excluding a specific region 250 in the entire range of the first intended dividing line C1. Here, the specific region 250 is an ineffective region at an outer periphery of the wafer 12, for example. This ineffective region is a region apart away from chips 14 in the wafer 12 (a region that does not affect quality of the chips 14).

The imaging controller 112 in the second embodiment drives the stage drive mechanism 26 and the unit drive mechanism 32 via the motion controller 84, thereby relatively moving the specific region 250 into the imaging range VA of the infrared microscope 30. The imaging controller 112 then controls the infrared microscope 30, thereby causing the infrared microscope 30 to capture the captured image 122 of the specific region 250 in a state where the focus of the infrared microscope 30 is aligned at the front surface of wafer 12.

In this case, no modified region 200 of the second layer is formed above the modified regions 200 for correction (the modified region 200 of the first layer) in the Z direction, that is, no modified region 200 and cracks 202 of the second layer are formed between the modified regions 200 for correction and the infrared microscope 30. With this configuration, in a case where the arithmetic operation unit 114 detects the modified regions 200 for correction in the captured image 122, effects of the modified region 200 and the cracks 202 of the second layer can surely be prevented. As a result, in the second embodiment, detection accuracy of the actual measured value of the formation position of the modified region 200 for correction is improved, whereby the positional relationship information 92 can be corrected with higher accuracy.

Note that, in the second embodiment, laser machining conditions of the modified regions 200 of the first layer (the modified regions 200 for correction) in the specific region 250 may be different from those of the modified regions 200 of the first layer outside the specific region 250. Specifically, the formation may be performed under such laser machining conditions of the modified regions 200 of the first layer in the specific region 250 that improve contrast of the modified regions 200 for correction in the captured image 122 (for example, a line width of each modified region 200 for correction is reduced).

Third Embodiment

Figure 15:
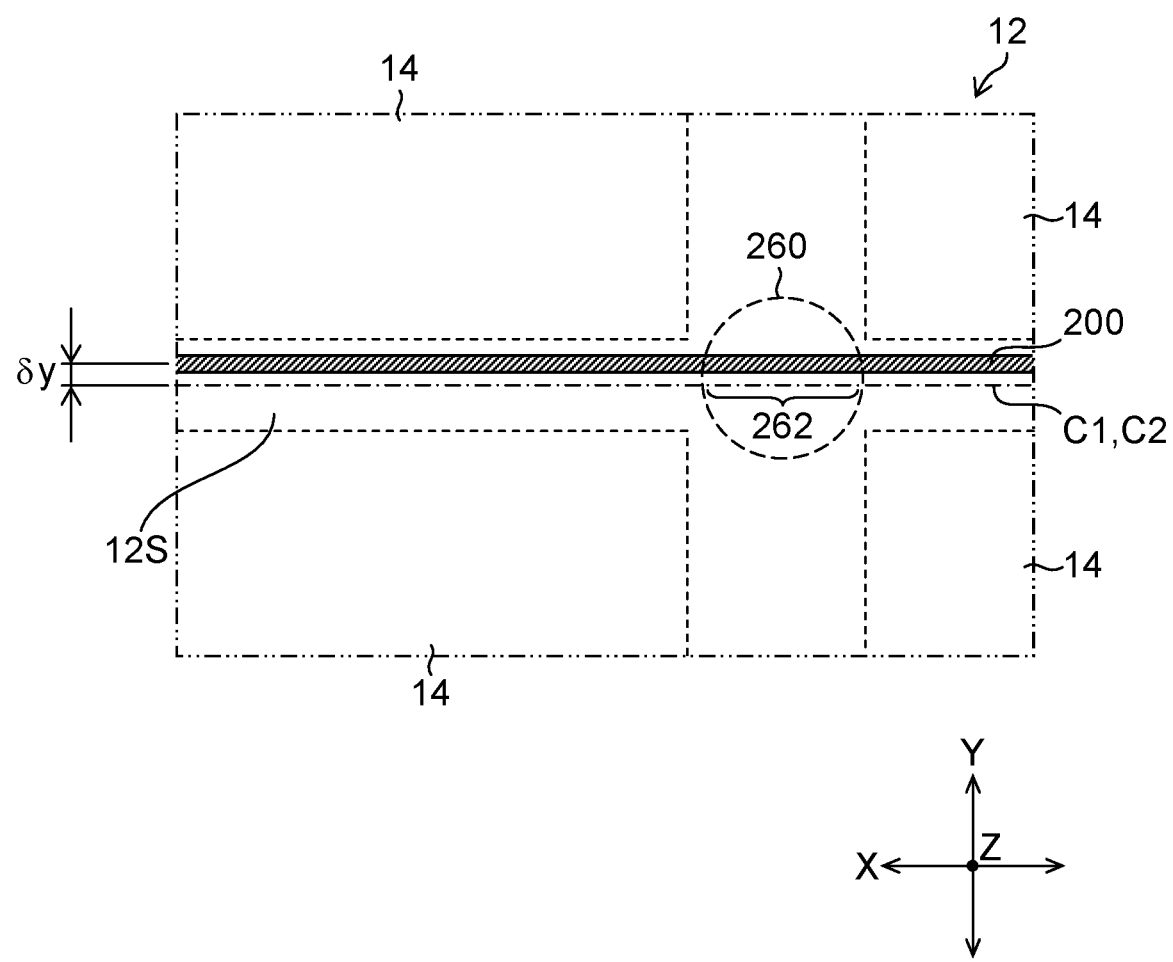
FIG. 15 is an explanation view for explaining laser machining of a wafer by a laser machining device according to a third embodiment.
Figure 16:
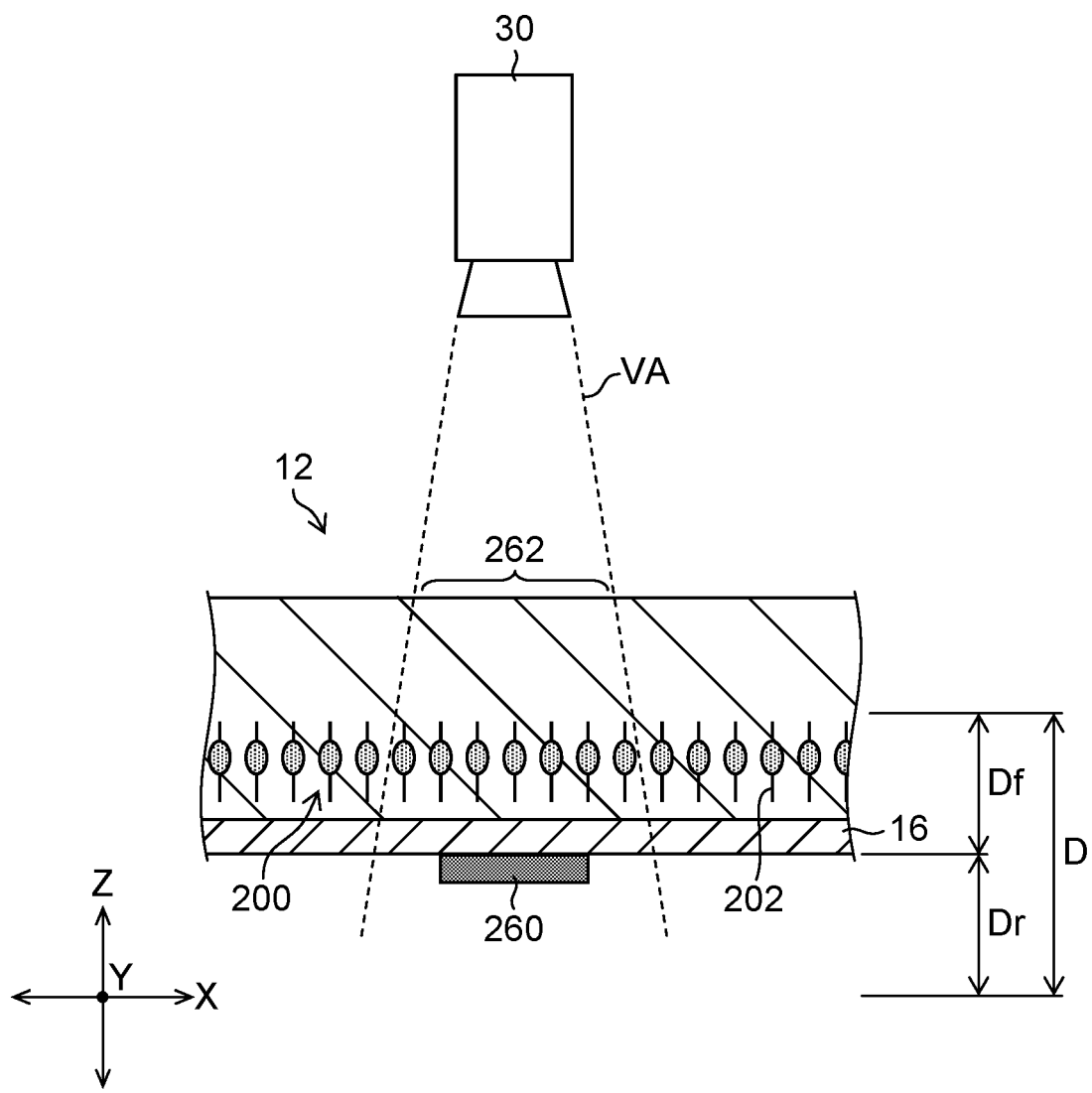
FIG. 16 is an explanation view for explaining the laser machining of the wafer by the laser machining device according to the third embodiment.

FIG. 15 and FIG. 16 are explanation views for explaining laser machining of the wafer 12 by a laser machining device 10 of a third embodiment. Note that, since the laser machining device 10 of the third embodiment basically has the same configuration as that of the laser machining device 10 of the first embodiment described above, the same functions or configurations as those in the first embodiment are attached by the same reference numerals, and a description thereof will be omitted.

As shown in FIG. 15 and FIG. 16, in the third embodiment, the imaging position of the wafer 12 by the infrared microscope 30 is made different from the imaging position of each above-described embodiment. Here, for example, a metal pattern 260 such as a TEG (test element group) for testing functions of the device is formed on the front surface of the wafer 12 (device layer 16).

The imaging controller 112 of the third embodiment drives the stage drive mechanism 26 and the unit drive mechanism 32, thereby relatively moving a pattern formation region 262 that is a region where the metal pattern 260 is formed in the first intended dividing lines C1, C2 into the imaging range VA of the infrared microscope 30. The imaging controller 112 then causes the infrared microscope 30 to capture the captured image 122 of the pattern formation region 262 in a state where the focus of the infrared microscope 30 is aligned at the front surface of the wafer 12 (metal pattern 260). With this configuration, the image data of the captured image 122 of the pattern formation region 262 in the first intended dividing lines C1, C2 can be obtained.

In the captured image 122 of the pattern formation region 262, both the modified region 200 for correction and the metal pattern 260 are focused. Therefore, a background of the modified region 200 for correction is the metal pattern 260, whereby contrast of the modified region 200 for correction can be improved under epi-illumination by the infrared microscope 30. As a result, also in the third embodiment, detection accuracy of the actual measured value of the formation position of the modified region 200 for correction is improved, whereby the positional relationship information 92 can be corrected with higher accuracy.

[Modification of Machining Unit]

FIG. 17 is an explanation view for explaining a modified example of the machining unit 22. In the machining unit 22 of the above-described embodiments, in the design, the position of the optical axis A1 of the laser unit 28 and the position of the optical axis A2 of the infrared camera 70 are the same in the Y direction. However, as designated by a reference character XVIIA in FIG. 17, the position of the optical axis A1 of the laser unit 28 and the position of the optical axis A2 of the infrared camera 70 may be deviated (shifted) in the Y direction. Note that $\Delta y = Y2 - Y1$ is satisfied.

As designated by a reference character XVIIB in FIG. 17, even when the position of the optical axis A1 of the laser unit 28 and the position of the optical axis A2 of the infrared camera 70 in the Y direction are deviated, similar to the above-described embodiments, an actual relative positional relationship between the optical axis A1 and the optical axis A2 can be arithmetically operated based on the arithmetic operation result ($\delta y$) of the positional deviation by the arithmetic operation unit 114. As a result, similar to the above-described embodiments, the positional relationship information 92 in the storage 82 can be corrected.

[Others]

In the above-described embodiments, the deviation of the positional relationship between the optical axis A1 of the laser unit 28 and the optical axis A2 of the infrared microscope 30 in the Y direction is detected, and the positional relationship information 92 in the Y direction is corrected (updated) based on the detection result of the deviation. However, positional deviation between the optical axis A1 and the optical axis A2 in the X direction may be detected, and the positional relationship information 92 in the X direction may be corrected. In this case, for example, the positional deviation between the theoretical value and the actual measured value at a start position and/or an end position of the modified region 200 for correction in the X direction is detected, and the positional relationship information 92 in the X direction is corrected based on the detection result of the deviation. Note that a specific method is basically the same as the detection of the positional deviation in the Y direction and the correction of the positional relationship information 92, and therefore specific explanation will be omitted here.

In the above-described embodiments, the modified region 200 of the first layer corresponding to each of the first intended dividing lines C1, C2 is used as the modified region 200 for correction, but the modified region 200 of the first layer corresponding to any of the second and subsequent intended dividing lines C1, C2 may be used as the modified region 200 for correction.

In the above-described embodiments, as the relative motion mechanism of the present invention, the stage drive mechanism 26 and the unit drive mechanism 32 are explained as examples, but the configuration is not particularly limited thereto as long as the laser unit 28 and the infrared microscope 30, and the wafer 12 can be relatively moved.

In the above-described embodiments, the infrared microscope 30 is joined to the outer portion of the laser unit 28, but the infrared microscope 30 may be provided in a housing of the laser unit 28.

REFERENCE SIGNS LIST

10: laser machining device
12: wafer
22: machining unit
24: control device
26: stage drive mechanism
28: laser unit
30: infrared microscope
32: unit drive mechanism
80: integrated controller
92: positional relationship information
96: detection controller
98: laser machining controller 102: captured image
112: imaging controller
114: arithmetic operation unit
116: correction unit
122: captured image
200: modified region (modified region for correction)
250: specific region
260: metal pattern
262: pattern formation region

What is claimed is:

1. A laser machining device which condenses a laser light inside a wafer and forms modified regions in a plurality of layers in the wafer, comprising
an infrared imaging optical system which includes an infrared microscope and an infrared camera, and is configured to face one surface of the wafer, wherein
in a case where a modified region positioned on a side of another surface opposite to the one surface of the wafer is defined as a first modified region and another modified region is defined as a second modified region, among the modified regions in the plurality of layers,
the infrared imaging optical system has a focusing range that includes the first modified region and the another surface, and simultaneously images the first modified region and the another surface, and
the second modified region is positioned outside the focusing range.

2. The laser machining device according to claim 1, wherein
the infrared imaging optical system simultaneously images the another surface and a non-overlapping region where the second modified region does not overlap with the first modified region in a thickness direction of the wafer, in the first modified region.

3. The laser machining device according to claim 1, wherein the infrared imaging optical system simultaneously images the first modified region and a region where a metal pattern is formed in the another surface, in a manner that the region where the metal pattern is formed becomes a background in order to improve a contrast with the first modified region.

4. The laser machining device according to claim 1, comprising
an arithmetic operation unit which includes a controller and is configured to arithmetically operate a positional deviation between a theoretical value and an actual measured value of the first modified region, based on the image which is simultaneously imaged by the infrared imaging optical system.

5. The laser machining device according to claim 1, wherein
a focus of the infrared imaging optical system is on the another surface.

6. A laser machining device which condenses a laser light inside a wafer and forms modified regions in a plurality of layers in the wafer, comprising
an infrared imaging optical system which includes an infrared microscope and an infrared camera, and is configured to face one surface of the wafer, wherein
in a case where a modified region positioned on a side of another surface opposite to the one surface of the wafer is defined as a first modified region and another modified region is defined as a second modified region, among the modified regions in the plurality of layers,
the infrared imaging optical system has a focusing range that includes the first modified region and the another surface, and simultaneously images the first modified region and the another surface, and
the infrared imaging optical system simultaneously images the another surface and a non-overlapping region where the second modified region does not overlap with the first modified region in a thickness direction of the wafer, in the first modified region.

7. The laser machining device according to claim 6, wherein
the infrared imaging optical system simultaneously images the first modified region and a region where a metal pattern is formed in the another surface, in a manner that the region where the metal pattern is formed becomes a background in order to improve a contrast with the first modified region.

8. The laser machining device according to claim 6, comprising
an arithmetic operation unit which includes a controller and is configured to arithmetically operate a positional deviation between a theoretical value and an actual measured value of the first modified region, based on the image which is simultaneously imaged by the infrared imaging optical system.

9. The laser machining device according to claim 6, wherein
a focus of the infrared imaging optical system is on the another surface.

10. An imaging device for detecting modified regions in a plurality of layers formed in a wafer, comprising
an infrared imaging optical system which includes an infrared microscope and an infrared camera, and is configured to face one surface of the water, wherein
in a case where a modified region positioned on a side of another surface opposite to the one surface of the wafer is defined as a first modified region and another modified region is defined as a second modified region, among the modified regions in the plurality of layers,
the infrared imaging optical system has a focusing range that includes the first modified region and the another surface, and simultaneously images the first modified region and the another surface, and
the second modified region is positioned outside the focusing range.

11. The imaging device according to claim 10, wherein
the infrared imaging optical system simultaneously images the another surface and a non-overlapping region where the second modified region does not overlap with the first modified region in a thickness direction of the wafer, in the first modified region.

12. The imaging device according to claim 10, wherein
the infrared imaging optical system simultaneously images the first modified region and a region where a metal pattern is formed in the another surface, in a manner that the region where the metal pattern is formed becomes a background in order to improve a contrast with the first modified region.

13. An imaging device for detecting modified regions in a plurality of layers formed in a wafer, comprising
an infrared imaging optical system which includes an infrared microscope and an infrared camera, and is configured to face one surface of the wafer, wherein
in a case where a modified region positioned on a side of another surface opposite to the one surface of the wafer is defined as a first modified region and another modified region is defined as a second modified region, among the modified regions in the plurality of layers, the infrared imaging optical system has a focusing range that includes the first modified region and the another surface, and simultaneously images the first modified region and the another surface, and the infrared imaging optical system simultaneously images the another surface and a non-overlapping region where the second modified region does not overlap with the first modified region in a thickness direction of the wafer, in the first modified region.

14. The imaging device according to claim 13, wherein the infrared imaging optical system simultaneously images the first modified region and a region where a metal pattern is formed in the another surface, in a manner that the region where the metal pattern is formed becomes a background in order to improve a contrast with the first modified region.

* * * * *